United States Patent
Mohajeri et al.

(10) Patent No.: US 9,450,919 B2
(45) Date of Patent: Sep. 20, 2016

(54) ALGORITHM-BASED ANONYMOUS CUSTOMER REFERENCES

(75) Inventors: Shahram Mohajeri, Sammamish, WA (US); Bryan L. Sullivan, Sammamish, WA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 729 days.

(21) Appl. No.: 13/594,161

(22) Filed: Aug. 24, 2012

(65) Prior Publication Data

US 2014/0059343 A1 Feb. 27, 2014

(51) Int. Cl.
*H04L 29/06* (2006.01)
*H04W 12/02* (2009.01)
*H04W 12/06* (2009.01)

(52) U.S. Cl.
CPC .......... *H04L 63/0281* (2013.01); *H04W 12/02* (2013.01); *H04W 12/06* (2013.01)

(58) Field of Classification Search
CPC ...... H04W 12/02; H04W 12/60; H04L 9/00; H04L 63/0407; H04L 63/0421; H04L 63/0281; G06F 21/62; G06F 21/6263
See application file for complete search history.

(56) References Cited

U.S. PATENT DOCUMENTS

| | | | |
|---|---|---|---|
| 7,092,367 B2 | 8/2006 | Kawai et al. | |
| 8,713,669 B2 * | 4/2014 | Guichard | H04L 63/0272 380/277 |
| 8,718,607 B2 | 5/2014 | Mohajeri | |
| 8,989,710 B2 | 3/2015 | Mohajeri | |
| 9,031,539 B2 | 5/2015 | Mohajeri | |
| 2005/0043041 A1 * | 2/2005 | Ignatius et al. | 455/456.2 |
| 2006/0053296 A1 | 3/2006 | Busboom et al. | |
| 2007/0110050 A1 | 5/2007 | Johns et al. | |
| 2008/0293378 A1 * | 11/2008 | Hinton | H04L 63/0407 455/411 |
| 2009/0106413 A1 | 4/2009 | Salo et al. | |
| 2009/0174551 A1 | 7/2009 | Quinn et al. | |
| 2009/0217351 A1 | 8/2009 | Burch et al. | |
| 2009/0227290 A1 * | 9/2009 | Chien | 455/558 |

(Continued)

OTHER PUBLICATIONS

Elaine Barker, William Barker, William Burr, William Polk, Miles Smid, "Recommendation for Key Management—Part 1: General", Mar. 2007, National Institute of Standards and Technology, pp. 22, 28.*

Office Action dated Jun. 16, 2014 for U.S. Appl. No. 13/482,962, 29 pages.

Office Action dated Aug. 6, 2013 for U.S. Appl. No. 13/445,714, 24 pages.

(Continued)

*Primary Examiner* — Jeffrey Pwu
*Assistant Examiner* — Thong Truong
(74) *Attorney, Agent, or Firm* — Amin, Turocy & Watson, LLP

(57) ABSTRACT

A system and methodology that facilitates management and utilization of domain-specific anonymous customer references (ACRs) for protecting subscriber privacy across different domains is disclosed herein. In one aspect, on receiving user authorization, an ACR services (ACRS) component can generate an ACR that is to be inserted in a communication or message transmitted from a user equipment to an untrusted entity. The ACR can be generated based on address data associated with the untrusted entity and/or a unique subscriber identifier associated with the user equipment. As an example, the ACR creation component can generate the ACR based on a cryptographic hash, a static encryption key, and/or a dynamic encryption key. If the ACR is forwarded to a trusted entity, the trusted entity can calculate the unique subscriber identifier based on evaluating the ACR and/or exchange the ACR for the unique subscriber identifier via a secure communication with the ACRS component.

20 Claims, 17 Drawing Sheets

(56) References Cited

U.S. PATENT DOCUMENTS

| | | | |
|---|---|---|---|
| 2010/0091763 A1* | 4/2010 | Thompson | 370/352 |
| 2010/0146603 A1* | 6/2010 | Lee | H04L 63/0407 |
| | | | 726/6 |
| 2010/0279718 A1 | 11/2010 | Borve et al. | |
| 2012/0110469 A1* | 5/2012 | Magarshak | H04L 9/321 |
| | | | 715/747 |
| 2012/0190363 A1 | 7/2012 | Maeda et al. | |
| 2013/0080774 A1* | 3/2013 | Combet et al. | 713/168 |
| 2013/0291071 A1 | 10/2013 | Blom et al. | |
| 2013/0304604 A1 | 11/2013 | Hoffman et al. | |
| 2014/0101743 A1 | 4/2014 | Busboom et al. | |

OTHER PUBLICATIONS

'Proxy Blind—Staying Anonymous in the Age of Surveillance', www.proxyblind.org, last accessed Jul. 5, 2012.

'Proxy Server Privacy', www.proxyserverprivacy.com, last accessed Jul. 5, 2012.

'Find IP Address', http://www.find-ip-address.org/hide-my-ip.php, last accessed Jul. 5, 2012.

'How do I hide my IP address', http://whatismyipaddress.com/hide-ip, last accessed Jul. 5, 2012.

Non-Final Office Action dated Jul. 23, 2014 for U.S. Appl. No. 14/219,833, 38 pages.

Office Action dated Apr. 8, 2016 for U.S. Appl. No. 14/673,206, 35 pages.

\* cited by examiner

ALGORITHM-BASED ANONYMOUS CUSTOMER REFERENCES

CROSS REFERENCE TO RELATED APPLICATIONS

This application is related to co-pending U.S. patent application Ser. No. 13/445,714, filed on Apr. 12, 2012, entitled "ANONYMOUS CUSTOMER REFERENCE SERVICES ENABLER," and co-pending U.S. patent application Ser. No. 13/482,962, filed on May 29, 2012, entitled "ANONYMOUS CUSTOMER REFERENCE CLIENT." The entireties of each of the foregoing applications are incorporated herein by reference.

TECHNICAL FIELD

The subject disclosure relates to wireless communications and, more particularly, to algorithm-based anonymous customer references.

BACKGROUND

Communication devices are seeing an explosive growth in application (app) development and utilization. The applications, or 'apps', can be pre-installed on the communication device by a manufacturer and/or downloaded by subscribers, for example, via an over-the-air (OTA) communication from a software distribution platform. By way of brief background, app developers can create custom applications by utilizing a unique identifier (ID) specific to a communication device. With communication devices and apps proliferating, protecting user privacy with respect to profiling and/or tracking a subscriber's behavior across apps and/or websites is of continued importance.

SUMMARY

The following presents a simplified summary of the specification in order to provide a basic understanding of some aspects of the specification. This summary is not an extensive overview of the specification. It is intended to neither identify key or critical elements of the specification nor delineate any scope particular embodiments of the specification, or any scope of the claims. Its sole purpose is to present some concepts of the specification in a simplified form as a prelude to the more detailed description that is presented later.

The systems and methods disclosed herein, in one aspect thereof, can reduce and/or deter cross-domain user activity tracking and/or profiling by unauthorized entities (e.g., websites, systems, etc.), by utilization of domain specific anonymous customer references (ACRs) as a device/subscriber identifier. In one aspect, the disclosed subject matter relates to a system comprising at least one memory that stores computer-executable instructions and at least one processor, communicatively coupled to the at least one memory, that facilitates execution of the computer-executable instructions. Moreover, the computer-executable instructions on execution receive via a telecommunication network, a message transmitted between a user equipment and an untrusted entity, subsequent to an authentication of the user equipment to allow the user equipment to connect with the telecommunication network, the authentication employing a static identifier associated with the user equipment. Additionally, the computer-executable instructions, on execution, assign a domain-specific anonymous customer reference to the static identifier, insert the domain-specific anonymous customer reference into the message, and facilitate a transmission of the message including the inserted domain-specific anonymous customer reference to the untrusted entity.

Another aspect of the disclosed subject matter relates to a method that includes receiving, by a system comprising at least one processor, a communication transmitted by a user equipment to an untrusted entity via a wireless communication network and determining, by the system, a static identifier associated with the user equipment based in part on an authorization of the user equipment with the wireless communication network. Further, the method includes based in part on the static identifier, automatically generating, by the system, an anonymous customer reference specific to the untrusted entity. Furthermore, the method includes inserting, by the system, the anonymous customer reference into the communication and facilitating, by the system, transmission of the communication including the inserted anonymous customer reference to the untrusted entity. Yet another aspect of the disclosed subject matter relates to a computer-readable storage medium comprising computer-executable instructions that, in response to execution, cause a system, including at least one processor, to perform operations including receiving via a telecommunication network, a message transmitted between a user equipment and an untrusted entity and identifying a static identifier associated with the user equipment based in part on an authorization of the user equipment with the telecommunication network. In addition, the operations include based in part on the static identifier, automatically generating an anonymous customer reference specific to the untrusted entity, inserting the anonymous customer reference into the message, and directing the message including the inserted anonymous customer reference to the untrusted entity The following description and the annexed drawings set forth certain illustrative aspects of the specification. These aspects are indicative, however, of but a few of the various ways in which the principles of the specification may be employed. Other advantages and novel features of the specification will become apparent from the following detailed description of the specification when considered in conjunction with the drawings.

DETAILED DESCRIPTION

Figure 1:
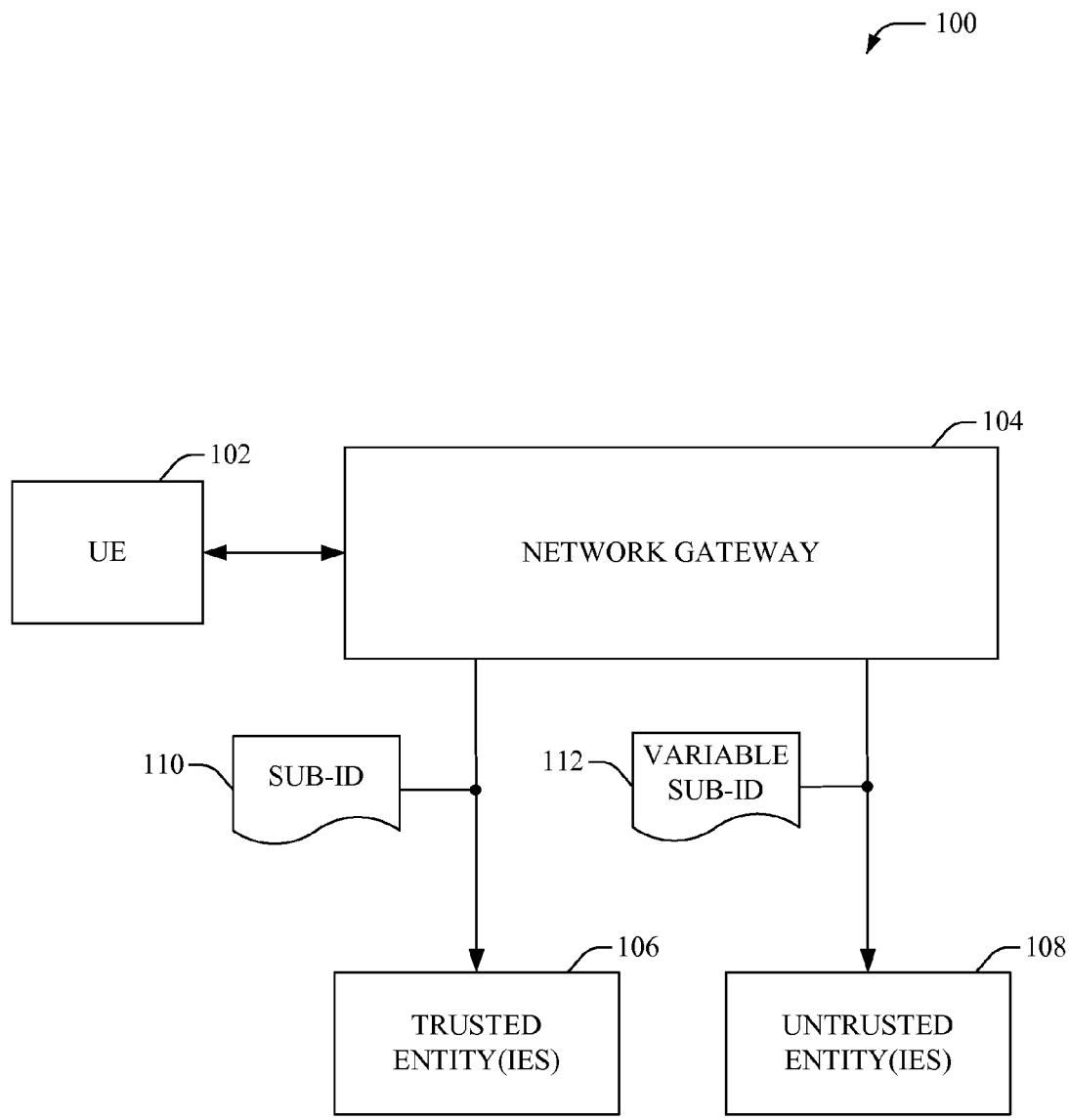
FIG. 1 illustrates an example system that facilitates utilization of a variable subscriber identifier (V-SubId) to protect user privacy.

One or more embodiments are now described with reference to the drawings, wherein like reference numerals are used to refer to like elements throughout. In the following description, for purposes of explanation, numerous specific details are set forth in order to provide a thorough understanding of the various embodiments. It may be evident, however, that the various embodiments can be practiced without these specific details, e.g., without applying to any particular networked environment or standard. In other instances, well-known structures and devices are shown in block diagram form in order to facilitate describing the embodiments in additional detail.

As used in this application, the terms "component," "module," "system," "interface," "service," "platform," "gateway," or the like are generally intended to refer to a computer-related entity, either hardware, a combination of hardware and software, software, or software in execution or an entity related to an operational machine with one or more specific functionalities. For example, a component may be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include I/O components as well as associated processor, application, and/or API components.

Further, the various embodiments can be implemented as a method, apparatus, or article of manufacture using standard programming and/or engineering techniques to produce software, firmware, hardware, or any combination thereof to control a computer to implement one or more aspects of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Of course, those skilled in the art will recognize many modifications can be made to this configuration without departing from the scope or spirit of the various embodiments.

In addition, the words "example" or "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms like "user equipment," "mobile station," "mobile device," and similar terminology, refer to a wired or wireless device utilized by a subscriber or user of a wired or wireless communication service to receive or convey data, control, voice, video, sound, gaming, or substantially any data-stream or signaling-stream. The foregoing terms are utilized interchangeably in the subject specification and related drawings. Data and signaling streams can be packetized or frame-based flows. Furthermore, the terms "user," "subscriber," "customer," "consumer," and the like are employed interchangeably throughout the subject specification, unless context warrants particular distinction(s) among the terms. It should be appreciated that such terms can refer to human entities or automated components supported through artificial intelligence (e.g., a capacity to make inference based on complex mathematical formalisms), which can provide simulated vision, sound recognition and so forth.

Application (app) developers and other potentially non-trusted entities can monitor and/or track communication device users through a unique identifier (ID) (e.g., subscriber identifier (SubId) and/or unique device ID (UDID)) related to a subscriber of the communication device, creating privacy problems for the users. The systems and methods disclosed herein facilitate generation and utilization of a variable subscriber ID (V-SubId) to prevent or impede profiling and/or subscriber-behavior tracking by unauthorized applications/entities. In one aspect, the V-SubId masks the subscriber's identity (e.g., UDID and/or SubId) from selected unauthorized websites and/or applications that are accessed by the subscribers. Moreover, the V-SubId can be modified periodically such that subscriber privacy can be protected.

Aspects or features of the disclosed subject matter can be exploited in substantially any wired or wireless communication technology; e.g., Universal Mobile Telecommunications System (UMTS), Wi-Fi, Worldwide Interoperability for Microwave Access (WiMAX), General Packet Radio Service (GPRS), Enhanced GPRS, Third Generation Partnership Project (3GPP) Long Term Evolution (LTE), Third Generation Partnership Project 2 (3GPP2) Ultra Mobile Broadband (UMB), High Speed Packet Access (HSPA), Zigbee, or another IEEE 802.XX technology. Additionally, substantially all aspects of the disclosed subject matter can be exploited in legacy (e.g., wireline) telecommunication technologies.

Referring initially to FIG. 1, there illustrated is an example system 100 that facilitates utilization of a V-SubId to protect user privacy, according to one or more aspects of the disclosed subject matter. System 100 can assign a V-SubId to a subscriber's account/user equipment (UE) 102 in response to a successful authentication, such as a subscriber identity module (SIM) authentication and/or SIM-based authentication, between the UE 102 and a communication network. Moreover, system 100 can be utilized to mask or replace a unique ID associated with the UE 102 during communication between the UE 102 and one or more systems/services. Typically, UE 102 can include most any electronic communication device such as, but not limited to, most any consumer electronic device, for example, a tablet computer, a digital media player, a digital photo frame, a digital camera, a cellular phone, a personal computer, a personal digital assistant (PDA), a smart phone, a laptop, a gaming system, etc. Further, UE 102 can also include, for example, LTE-based devices, such as, but not limited to, most any home or commercial appliance that includes an LTE radio. It can be noted that UE 102 can be mobile, have limited mobility and/or be stationary. Typically, the subscriber of the UE 102 is assigned a unique and constant subscriber identifier (SubId), for example, that is associated with the subscriber identity module (SIM) and/or subscriber account associated with the UE 102. In one example, the SubId is independent of a Mobile Station International Subscriber Directory Number (MSISDN) and SIM of the UE 102, and does not change if the MSISDN is modified and/or SIM is replaced.

In one embodiment, system 100 can include a network gateway 104, for example, deployed within a communication network (e.g., cellular network), that facilitates routing of a message(s)/request(s) received from UE 102. As an example, the network gateway 104 can include, but is not limited to, a proxy server (e.g., a Hypertext Transfer Protocol (HTTP) proxy server) can be utilized for performing header enrichment in communication messages (e.g., HTTP requests) transmitted from the UE 102 to one or more network servers (not shown). It is to be noted that the proxy server is not limited to employing HTTP and can employ most any other Internet protocol(s) as might be supported by an Internet proxy/gateway. Further, the UE 102 can be coupled to the network gateway 104 via one or more radio access network(s) and/or network elements (not shown) of the mobility network. In one aspect, the UE 102, for example, on power-on or on entering a coverage area of the mobility network, can perform a SIM (or SIM-based) authentication with the communication network (e.g., via handshaking with a home location register (HLR)) to authorize the UE 102 to communicate via the communication network. By way of example, on authentication, a network support node, for example, Gateway GPRS Support Node (GGSN), can assign an Internet protocol (IP) address to the UE 102, identify a device number, such as, but not limited to, a MSISDN associated with the UE 102 (e.g., from the HLR), and propagate the IP address and corresponding MSISDN to downstream network elements such as the network gateway 104.

When a request from UE 102 is received, the network gateway 104 can detect an IP address from the request, and accordingly determine the corresponding MSISDN associated with the IP address. The request as disclosed herein can include most any communication message delivered from the UE 102 to a network server (e.g., a web server, an application server, an email server, etc.). In one example, the request can include (but is not limited to) a request for information/data from the network server. In another example, the request can also include (but is not limited to) an instruction and/or command for requesting the network server to perform a specific action (e.g., load a new web page, refresh a web page, delete an email, etc.). In yet another example, the request can include a HTTP request (e.g., a GET request, a PUT request, a DELETE request, etc.). However, it is noted that the subject disclosure is not limited to HTTP requests, and that the UE 102 can transmit requests utilizing most any communication protocol, for example (but not limited to), Secure-HTTP (S-HTTP), HTTP Secure (HTTPS), SPDY® protocol, Waka protocol, a proprietary protocol, etc. Moreover, if the UE 102 utilizes a secure protocol such as (but not limited to) S-HTTP and/or HTTPS, a network server (not shown) can perform a HTTP Redirect (302) onto an endpoint within the server served by HTTP such that the network gateway 104 can enrich the request with a V-SubId/SubId. Further, it is to be noted that V-SubId insertion is not limited to non-secure HTTP (or other Internet protocol(s)), but also can be applied to these protocols when tunneled over a secure connection (e.g., Secure Sockets Layer (SSL), Transport Layer Security (TLS), Datagram Transport Layer Security (DTLS), etc.) if a network proxy/gateway (e.g., an enterprise proxy) can transparently de/re-encrypt the data as it passes through the proxy/gateway. Furthermore, although mobility and/or cellular networks are described herein, it is noted that the network gateway 104 can reside within most any communication network (e.g., wired or wireless) that facilitates authentication with UE 102 based on a unique ID/credential associated with the UE 102 and/or subscriber of the UE 102, prior to the UE 102 connecting to and/or accessing the communication network.

In one aspect, the network gateway 104 can employ a SubId enrichment policy, wherein on receiving a request (communication message and/or data packet) from UE 102, the network gateway 104 identifies a SubId 110 associated with the MSISDN of the UE 102 and enriches a header of the request with the SubId data, based in part on the destination of the request. Typically, the SubId 110 is a unique and unchangeable identifier associated with a subscriber of UE 102. In particular, the network gateway 104 can determine whether the destination of the request is a trusted entity(ies) 106 (e.g., an entity authorized to access the SubId) or an untrusted entity(ies) 108 (e.g., an entity that is not authorized to access the SubId), for example, based on a destination uniform resource locator (URL) within the request. In one example, if the network gateway 104 determines that the destination of the request is a trusted entity 106, the header of the request can be updated with the SubId 110 associated with UE 102, and the updated request can be forwarded to the trusted entity 106. As an example, the trusted entity 106 can utilize the SubId 110 to enable consistent data services and/or a seamless service experience across data sessions for the UE 102 (e.g., one-click payment taking advantage of implicit authentication already done as part of the device's logging-on and/or connecting to the mobile network).

Alternatively, if the network gateway 104 determines that the destination of the request is an untrusted entity 108, the header of the request is updated with a V-SubId 112. The updated request can then be forwarded to the untrusted entity 108. Since the V-SubId 112 can change with time (e.g., periodically, on demand, based on an event/schedule, etc.) and/or across data sessions, the untrusted entity 108 cannot track and/or profile subscriber activity. Moreover, the V-SubId 112 can be randomly generated, unique, opaque, and/or can be repeated and/or reused. Accordingly, the V-SubId 112, due to its changing nature, can prevent traceability of the subscriber by the untrusted entity 108, while allowing a network service provider to uniquely identify the subscriber associated with the V-SubId, if the need arises (e.g., for law enforcement).

Figure 2:
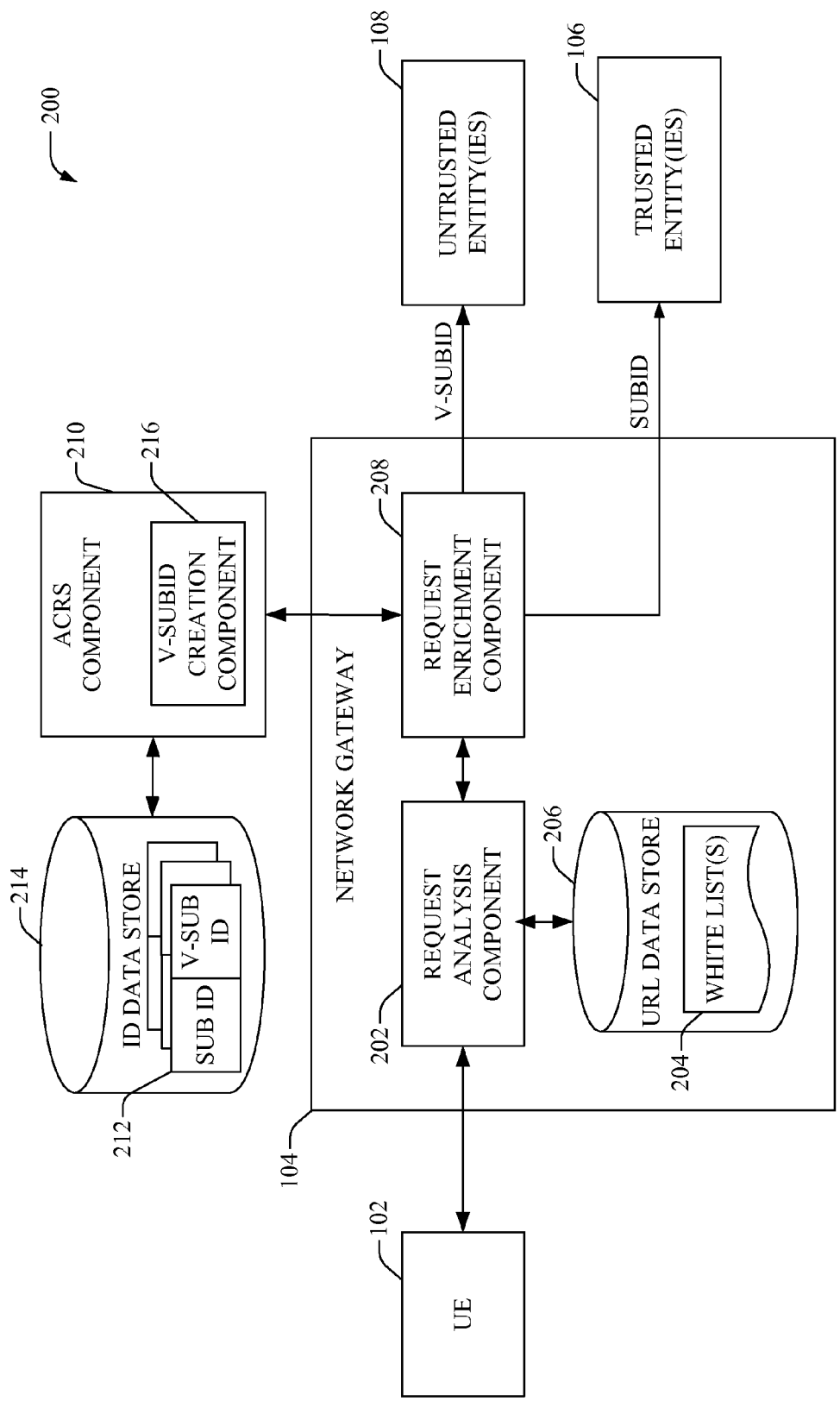
FIG. 2 illustrates an example system that facilitates generation and transmission of V-SubIds over a mobility network.

Referring now to FIG. 2, there illustrated is an example system 200 that facilitates generation and transmission of V-SubIds over a mobility network, in accordance with an aspect of the subject disclosure. To mitigate the risk of undesired subscriber-behavior tracking by unauthorized systems, system 200 facilitates V-SubId insertion in a data packet in place of a unique SubId insertion, in response to the data packet being directed to the unauthorized systems. It is noted that the UE 102, network gateway 104, trusted entity(ies) 106, and untrusted entity(ies) 108 can include functionality as more fully described herein, for example, as described above with regard to system 100.

In one embodiment, the network gateway 104 can include a request analysis component 202 that can determine whether a request, received from UE 102, is to be enriched with a V-SubId or a unique SubId (e.g., a SubId that is constant/static). The request analysis component 202 can receive the request from the UE 102 and can analyze at least a portion of the request, for example, a header (e.g., HTTP header) associated with the request. In one example, based on the analysis, the request analysis component 202 can identify a destination URL to which the request is directed. Further, the request analysis component 202 can compare the destination URL with a set of authorized and/or trusted URLs stored in whitelist(s) 204 that is retained in a URL data store 206. By way of example, whitelist(s) 204 can include a set of URLs associated with trusted websites, systems, content providers, service providers, etc. In an aspect, the whitelist(s) 204 can typically be created, updated, and/or managed by a network operator associated with the network service provider. Further, the request analysis component 202 can determine an IP address of the UE 102 (e.g., based on the analysis of the request) and can identify a corresponding device ID (e.g., MSISDN) of the UE 102.

Moreover, if the request analysis component 202 identifies that the destination URL is within the whitelist(s) 204, then a request enrichment component 208 can map the device ID (e.g., MSISDN) to a unique SubId associated with the subscriber (e.g., via a database lookup) and insert the SubId within the request (e.g., within the header of the request). Further, the request enrichment component 208 can forward the enriched/updated request to a trusted entity 106 associated with the destination URL. Alternatively, if the request analysis component 202 identifies that the destination URL is not within the whitelist(s) 204, then the request enrichment component 208 can determine a V-SubId for the request. According to an embodiment, the request enrichment component 208 can access an anonymous customer reference services (ACRS) component 210 to receive the V-SubId. Moreover, the ACRS component 210 can facilitate generation and management of V-SubIds. Further, the ACRS component 210 can include a V-SubId creation component 216 that can generate a SIM-based identifier (e.g., an identifier generated in response to a SIM-based authentication performed as part of the UE 102's connecting to the mobility network being successful) and provide the SIM-based identifier to external systems and application developers. As an example, the V-SubId can include most any random, opaque, unique (for a specific time and/or session), number or code that can change based on an event/criterion, such as (but not limited to) expiration of a timer, termination of a data session, etc. In an aspect, the V-SubId creation component 216 can generate the V-SubId by employing most any random number generator that can create the V-SubId based on, or independent of, the SubId, MSISDN, device ID, etc. For example, the V-SubId creation component 216 can utilize a 32-digit long random number or an MD5 hash of a random number.

Further, the V-SubId creation component 216 can store (e.g., temporarily or permanently) the V-SubId in one or more tables 212, retained within ID data store 214. As an example, a one-to-one mapping can typically exist between the V-SubId and the SubId associated with the UE 102 such that a SubId query based on the V-SubId can be performed (e.g., by service provider partner systems, law enforcement systems, etc.) and the SubId corresponding to the queried V-SubId be retrieved. In one aspect, the ACRS component 210 can determine when the subscriber's data session has ended or a timer associated with the V-SubId has expired, and can remove and/or modify the V-SubId from the one or more tables 212. As an example, transaction logs associated with creation and/or modification of records (e.g., including the V-SubId) within the one or more tables 212 can be saved (e.g., by the ACRS component 210), such that, a subscriber's transaction can be identified at a later time (e.g., for law-enforcement purposes).

In one aspect, on receiving a request for a V-SubId from the request enrichment component 208, the ACRS component 210 can perform a table lookup to determine if the subscriber for the destination URL has a previously generated valid and/or non-expired V-SubId stored in the one or more tables 212. If a valid and/or non-expired V-SubId exists for the subscriber, the existing V-SubId can be returned to the request enrichment component 208 by the ACRS component 210. In contrast, if valid and/or non-expired V-SubId does not exist for the subscriber, the V-SubId creation component 216 can generate a new V-SubId and return the new V-SubId to the request enrichment component 208. In one aspect, the request enrichment component 208 can insert the V-SubId within the request (e.g., within the header) and forward the enriched/updated request to an untrusted entity 108 associated with the destination URL. Additionally or optionally, the V-SubId can be stored at the network gateway 104 for a specific period (e.g., 24 hours) to avoid and/or reduce communication between the request enrichment component 208 and the ACRS component 210. In one aspect, to further increase efficiency, the request enrichment component 208 can utilize the same V-SubId (while not expired) across all untrusted entities 108 for a specific time.

Accordingly, system 200 facilitates delivery of SubIds to the trusted entity(ies) 106 and delivery of V-SubIds to the untrusted entity(ies) 108. Although only whitelist(s) 204 are depicted and described herein, it is noted that the URL data store 206 can also include blacklist(s) that specify URL(s) of untrusted entity(ies) 108, to which a V-SubId (and not a SubId) is to be transmitted. Further, it is noted that the URL data store 206 and the ID data store 214 can include volatile memory(s) or nonvolatile memory(s), or can include both volatile and nonvolatile memory(s). Examples of suitable types of volatile and non-volatile memory are described below with reference to FIG. 17. The memory (e.g., data stores, databases) of the subject systems and methods is intended to comprise, without being limited to, these and any other suitable types of memory.

Figure 3:
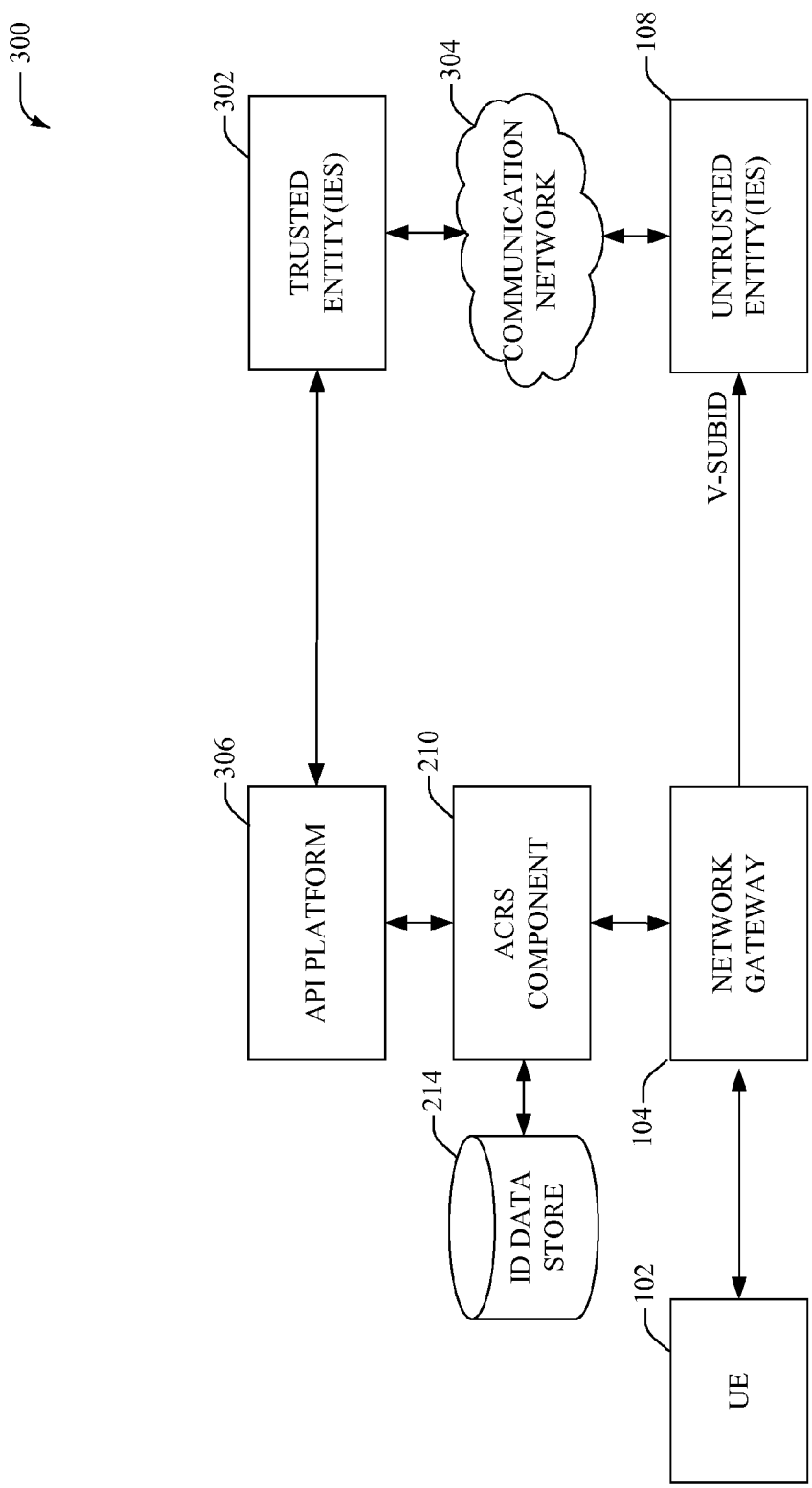
FIG. 3 illustrates an example system that facilitates a reverse lookup for a subscriber identifier (SubId) by a trusted entity.

Referring now to FIG. 3, there illustrated is an example system 300 that facilitates a reverse lookup for a SubId by a trusted entity, according to an aspect of the subject disclosure. Typically, system 300 can be utilized for providing an ID associated with a subscriber (e.g., static or dynamic), to one or more websites, systems, platforms, etc. to facilitate communication with UE 102. It is noted that the UE 102, network gateway 104, untrusted entity(ies) 108, ACRS component 210, and ID data store 214, can include functionality as more fully described herein, for example, as described above with regard to systems 100 and 200. System 300 can include a trusted entity(ies) 302, such as, but not limited to a trusted website, system, network, platform, server, etc., which can be authorized (e.g., by the user and/or service provider) to receive and/or utilize a SubId associated with the subscriber, for example, for value added services. Moreover, the trusted entity(ies) 302 can be substantially similar to trusted entity(ies) 106 and can include functionality as more fully described herein, for example, as described above with regard to trusted entity(ies) 106.

In one aspect, the UE 102 can communicate with the trusted entity(ies) 302 via the untrusted entity(ies) 108. For example, a trusted website can be accessed by the UE 102 from a link on an untrusted website. As described herein, the network gateway 104 provides a V-SubId to the untrusted entity(ies) 108, during communication between the UE 102 and the untrusted entity(ies) 108. As an example, the V-SubId is inserted within a request from the UE 102 to the untrusted entity(ies) 108, for example, within a header (e.g., HTTP header) in the request and/or the body of the request. In another example, the V-SubId can be appended to the header and/or body of the request. The V-SubId can be transmitted through a communication network 304, for example, via one or more websites/servers/systems, to the trusted entity(ies) 302. Based on an analysis of the request, the trusted entity(ies) 302 can detect that the received ID (e.g., within a header of a request) is a V-SubId. For example, V-SubIds can have a specific configuration and/or syntax, such as, but not limited to a predefined code within the first/last N digits/characters (wherein N can be most any positive integer), which can be identified by the trusted entity(ies) 302 to verify that the received ID is a V-SubId.

According to an embodiment, the trusted entity(ies) 302 can exchange the V-SubId for a SubId associated with the subscriber via an application programming interface (API) platform 306. As an example, the API platform 306 can receive the V-SubId from the trusted entity(ies) 302, verify that the trusted entity(ies) 302 is authorized to receive the SubId (e.g., based on a URL associated with the trusted entity(ies) 302), and query the ACRS component 210 for the SubId on successful verification. In one aspect, the ACRS component 210 can perform a reverse lookup to retrieve a SubId corresponding to the V-SubId, from the ID data store 214. As an example, the API platform 306 can provide an appropriate interface (e.g., Representational state transfer (RESTful) interface, Simple Object Access Protocol (SOAP) interface, etc.) to facilitate communication between the trusted entity(ies) 302 and the ACRS component 210.

The trusted entity(ies) 302 can utilize the SubId to apply user preferences and/or enable consistent data services and provide a seamless service experience across data sessions. Accordingly, system 300 can enrich a header (e.g., HTTP header) with a V-SubId that cannot be utilized by untrusted entities 108 for subscriber profiling, and can provide an API platform 306 that enables the trusted entity(ies) 302 to securely retrieve the SubId using the V-SubId. Although it is depicted in FIG. 3 as residing outside the ACRS component 210, the ID data store 214 also can reside (e.g., completely or partially) within the ACRS component 210 and/or be locally or remotely coupled to the ACRS component 210.

Figure 4:
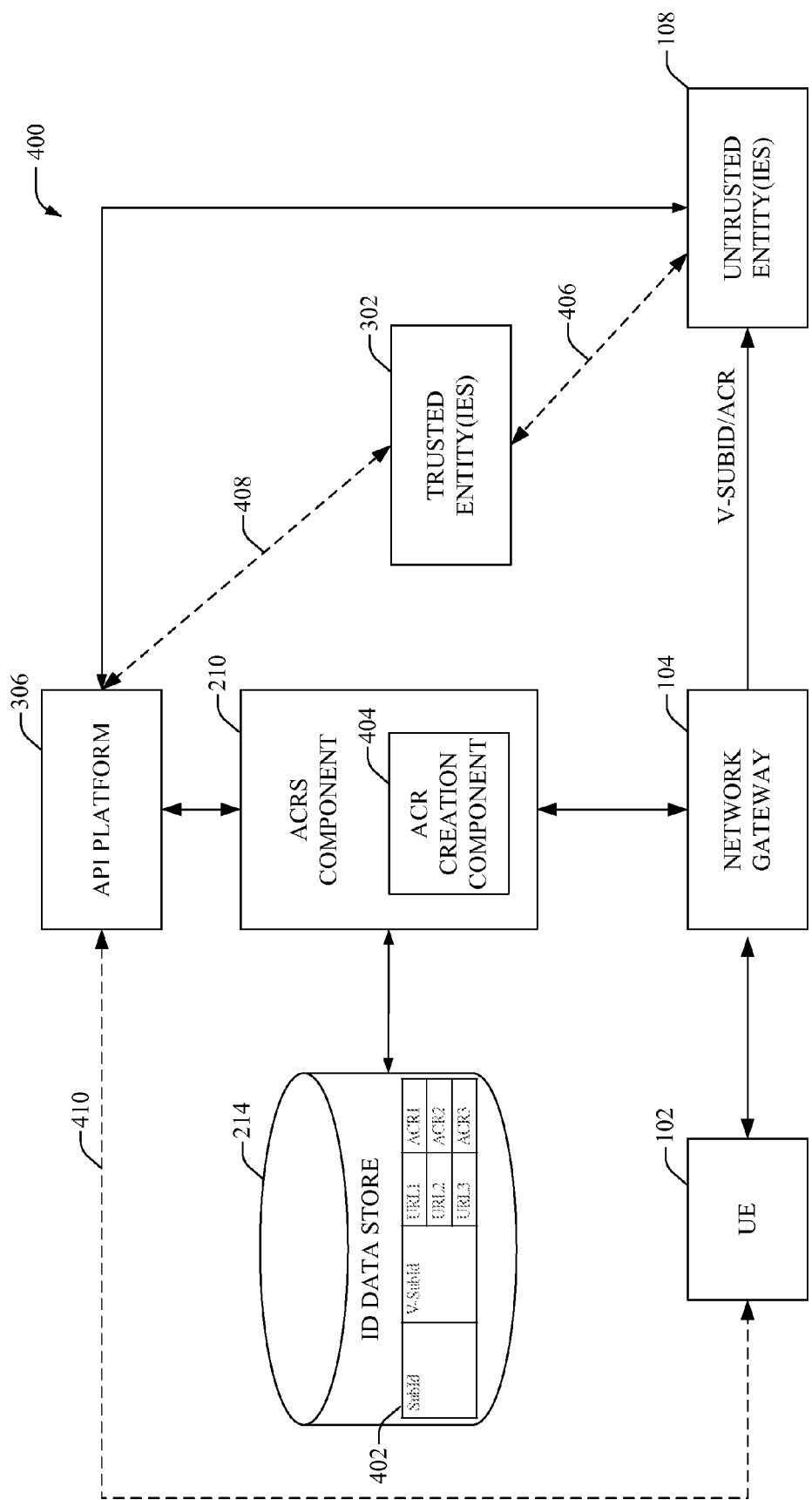
FIG. 4 illustrates an example system that facilitates generation and management of an anonymous customer reference (ACR).

FIG. 4 illustrates an example system 400 that facilitates generation and management of an anonymous customer reference (ACR) according to an aspect of the disclosed subject matter. As an example, the ACR can include a site/service-specific identifier that can be static and/or dynamically changing. Typically, system 400 can facilitate exchange of a V-SubId for a static/dynamic ACR and/or a static ACR for a dynamically changing ACR, based on a subscriber's authorization. Moreover, the system 400 enables a user to specify and/or authorize a site to receive a site-specific ID for a specific time period. The UE 102, network gateway 104, untrusted entity(ies) 108, ACRS component 210, ID data store 214, trusted entity(ies) 302, and API platform 306 can include functionality as more fully described herein, for example, as described above with regard to systems 100-300.

In one aspect, the API platform 306 provides an interface for the untrusted entity(ies) 108 to make a request for an ACR based on user authorization. The ACR creation component 404 can generate ACRs in real-time and manage ACR lifecycles. As an example, the ACR can include most any random number that can be based on or independent of a SubId associated with UE 102. Typically, the ACR can be specific to a particular website or set of websites and can be static and/or dynamic. In one aspect, the ACR creation component 404 can generate a unique and/or service/site-specific ACR based on address data of the untrusted entity(ies) 108 such as (but not limited to) a URL, Fully Qualified Domain Name (FQDN), an IP address, a uniform resource identifier (URI), etc. Moreover, the address data can be extracted from the request (e.g., header or body) received from UE 102.

On receiving a request to generate an ACR (static and/or dynamic) for a specific untrusted entity(ies) 108, the API platform 306 can facilitate authorization (e.g., depicted as a dotted line 410 in FIG. 4) with the UE 102 to receive subscriber consent and/or approval. As an example, the authorization can include (but is not limited to) an OAuth-flow that is used to ensure subscriber's authorization for the ACR request by the untrusted entity(ies) 108. OAuth is a security protocol that is developed by the Internet Engineering Task Force (IETF) OAuth Working Group and is defined by D. Hardt, Ed, "The OAuth 2.0 Authorization Protocol draft-ietf-oauth-v2-31," Jul. 31, 2012, which is incorporated by reference herein. It is noted that the subject disclosure is not limited to the OAuth protocol, and most any communication protocol can be utilized for authorization. On receiving subscriber authorization, API platform 306 can request the ACR creation component 404 to generate the ACR and transmit the ACR (e.g., through API Platform 306) to the untrusted entity(ies) 108. Additionally or optionally, the ACR creation component 404 can generate and store the ACR in a table 402 within the ID data store 214. For dynamic ACRs, the ACR creation component 404 can periodically update the value of the ACR (specific to an entity) and store the updated value in the table 402. Moreover, if user authorization is not received, the API Platform 306 will not forward the ACR request from the untrusted entity(ies) 108 to the ACR creation component 404.

In one example, the ACR creation component 404 can generate the ACR by applying a cryptographic hash function to a string composed from the untrusted entity(ies) 108's address and/or the subscriber's SubId. The resulting hash value is unique to the combination of the untrusted entity (ies) 108's Internet address and the subscriber's SubId. Since the ACR corresponds to a specific untrusted entity, cross-service correlation of user requests and/or tracking based upon that correlation (without further explicit correlating information provided by the user to each service) can be impeded and/or prevented. In one example, the cryptographic hash function can be a one-way hash, such that the value of the SubId cannot be determined by analyzing the ACR, to impede and/or prevent unauthorized determination of a SubId by the untrusted entity(ies) 108. In this example, if the ACR is communicated (e.g., via communication network 304) to a trusted entity(ies) 302 as shown by dotted line 406, the trusted entity(ies) 302 can request for the SubId associated with the ACR via communication 408 with the API platform 306 (as explained in detail above with respect to system 300). The ACR can include a predefined code, for example, within the first/last N digits/characters (wherein N can include most any positive integer), which can be identified by the trusted entity(ies) 302 to verify that the received ID is an ACR. Moreover, as with the V-SubId, the trusted entity can exchange the ACR for a SubId associated with the subscriber via the API platform 306. Moreover, the API platform 306 can receive the ACR from the trusted entity (ies) 302, determine that the trusted entity(ies) 302 is authorized to receive the SubId (e.g., based on a URL associated with the trusted entity(ies) 302), and query the ACRS component 210 for the SubId on successful verification. In one aspect, the ACRS component 210 can perform a reverse lookup to retrieve a SubId corresponding to the ACR, from the ID data store 214.

In another example, the ACR creation component 404 can generate the ACR by applying an encryption algorithm to the SubId, using a pre-provisioned encryption key specific to the untrusted entity(ies) 108. For example, the encryption key can be based on the address data (e.g., FQDN, IP address, URL, etc.) associated with the untrusted entity(ies) 108. The resulting ACR is unique to the combination of the untrusted entity(ies) 108's address and the SubId, and can thus impede and/or prevent cross-domain profiling. Further, the ACR creation component 404 can provide, via API platform 306, a decryption key (and/or password) to a trusted entity(ies) 302 as depicted by the dotted line 408. As an example, the decryption key can be provided to the trusted entity(ies) 302 at most any time, for example, on creation of the ACR, on receipt of a request from the trusted entity(ies) 302, on demand, on detection of an event, etc. In another example, the decryption key can be provided to the trusted entity(ies) 302 via out-of-band means. Moreover, the trusted entity(ies) 302 can store the decryption key (e.g., in a local data store (not shown)), utilize the decryption key to decrypt the ACR received from the untrusted entity(ies) 108, and identify the SubId associated with UE 102. Accordingly, communication between the trusted entity(ies) 302 and the API platform 306 can be reduced.

In yet another example, the ACR creation component 404 can generate a unique, dynamic, and site-specific ACR based upon the address data (e.g., FQDN, IP address, URL, etc.) associated with the untrusted entity(ies) 108. Moreover, the ACR is not static but changes over time (e.g., periodically, based on an event, on demand, per request, etc.) to reduce and/or prevent snooping, replay attacks, and other such security risks. In this example, the ACR creation component 404 applies an encryption algorithm to the SubId, using a dynamic encryption key. The algorithm for selection of the dynamic encryption key can vary based on the untrusted entity(ies) 108, and utilize different schedules for advancement to a new key value. As an example, the dynamic ACR is unique to a combination of the untrusted entity(ies) 108's address and the SubId associated with the UE 102. In one aspect, the encryption can include a two-step encryption, such that an authorized untrusted entity 108 can determine a static site/service-specific ACR and a trusted entity 302 can determine the SubId based on an analysis of the dynamic ACR.

Further, the ACR creation component 404 can provide, via API platform 306, dynamic encryption key algorithm to a trusted entity(ies) 302 as depicted by the dotted line 408. As an example, the dynamic encryption key algorithm can be provided to the trusted entity(ies) 302 at most any time, for example, on creation of the ACR, on receipt of a request from the trusted entity(ies) 302, on demand, on detection of an event, etc. In another example, the dynamic encryption key algorithm can also be provided to the trusted entity(ies) 302 via out-of-band means. The trusted entity(ies) 302 can store the dynamic encryption key algorithm (e.g., in a local data store (not shown)) and utilize the dynamic encryption key algorithm to identify the SubId associated with UE 102 based on decrypting the ACR received from the untrusted entity(ies) 108. In addition, another dynamic encryption key algorithm can be provided to the untrusted entity(ies) 108 based on user authorization (e.g., at most any time and/or via most any communication means). The untrusted entity(ies) 108 can store the other dynamic encryption key algorithm (e.g., in a local data store (not shown)) and utilize the other dynamic encryption key algorithm to identify a static site/service-specific ACR associated with UE 102 based on decrypting the dynamic ACR received from the network gateway 104. It is noted that the subject disclosure is not limited to the above noted ACR generation techniques/algorithms and that the ACR creation component 404 can utilize most any technique to generate a static and/or periodically changing site/service-specific ACR.

While the ACR is active for a given URL, the ACRS component 210 can provide the ACR to the network gateway 104, for enrichment of subsequent requests to the untrusted entity(ies) 108 from the UE 102. As an example, the expiration time associated with the ACR can be specified by the user during authorization and/or can be set to a code (e.g., "999") that indicates that the ACR will not expire unless explicitly requested by the subscriber and/or the untrusted entity(ies) 108. Further, the untrusted entity(ies) 108 and/or subscriber (via UE 102) can request an ACR cancellation through API platform 306. As an example, OAuth-flow can be employed to ensure subscriber's authorization for the ACR cancellation, if requested by the untrusted entity(ies) 108 (e.g., the same OAuth token that was utilized to create the ACR can be reused to cancel the ACR). Moreover, on receiving the ACR cancellation request (e.g., authorized by the subscriber), the ACRS component 210 can remove the ACR from the table 402 and notify the network gateway 104 of the cancelled ACR.

Figure 5:
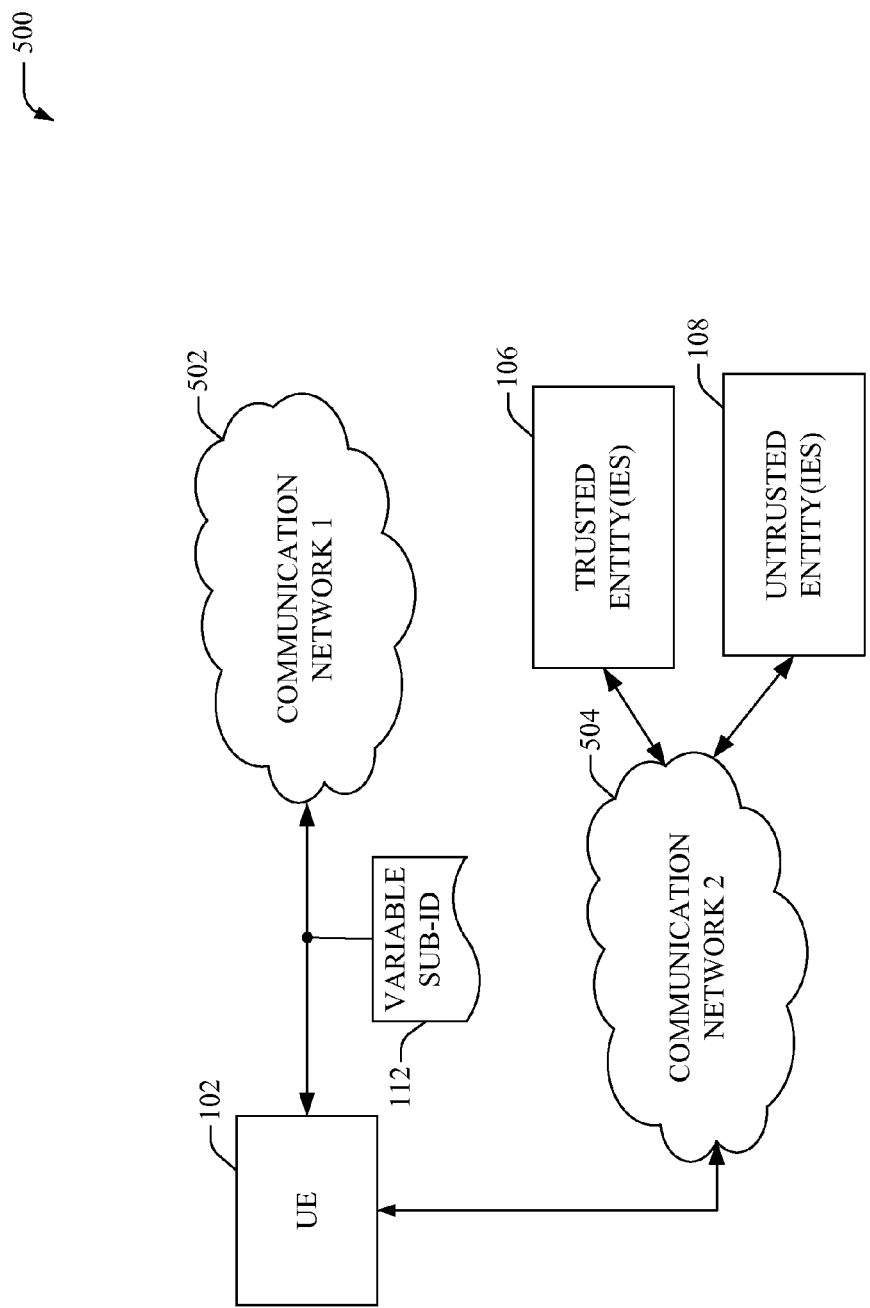
FIG. 5 illustrates an example system that facilitates utilization of a V-SubId as a device identifier for a user equipment.

Referring now to FIG. 5, there illustrated is an example system 500 that facilitates utilization of a V-SubId as a device identifier for a UE, according to one or more aspects of the disclosed subject matter. System 500 can assign a V-SubId to a subscriber's account and/or the UE 102 in response to a subscriber identity module (SIM) authentication, and/or SIM-based authentication, between the UE 102 and a communication network 502 being successful. System 500 can be utilized to mask and/or replace a unique ID associated with the UE 102 (e.g., unique device ID (UDID)) during communication between the UE 102 and one or more systems/services. The UE 102, trusted entity(ies) 106, untrusted entity(ies) 108, and V-SubId 112 can include functionality as more fully described herein, for example, as described above with regard to systems 100-400.

The UE 102 can be associated with a unique ID that facilitates identification of the subscriber and/or the UE 102. For example, a SubId can be assigned (e.g., by a service provider) to the subscriber of the UE 102. The SubId is a unique and constant subscriber identifier that is associated with the subscriber identity module (SIM) of the UE 102 and/or a subscriber account associated with the UE 102. In one example, the SubId is independent of a Mobile Station International Subscriber Directory Number (MSISDN) and/or SIM of the UE 102, and does not change if the MSISDN is modified and/or SIM is replaced. Additionally, the UE 102 can be assigned a unique device ID (UDID) (e.g., by a manufacturer and/or service provider), for example, a serial number that is specific to UE 102. In one aspect, applications (apps) residing on UE 102 utilize the UDID to facilitate customization and/or remember user preferences. Moreover, utilization of the UDID enables consistent data services and/or a seamless service experience across data sessions for the UE 102.

In one embodiment, system 500 can include a communication network 1 (502), for example, a cellular network, that can serve the UE 102. As an example, the UE 102 can be coupled to the communication network 1 (502) via one or more radio access network(s) and/or network elements (not shown). In an aspect, the UE 102, for example, on power-on and/or on entering a coverage area of the communication network 1 (502), can perform a SIM authentication with the communication network 1 (502) (e.g., via handshaking with a home location register (HLR)) to authorize the UE 102 to connect to and communicate via the communication network 1 (502). By way of example, on authentication, a network support node, for example, GGSN, can assign an Internet protocol (IP) address to the UE 102, identify a device number, such as, but not limited to, a Mobile Station International Subscriber Directory Number (MSISDN) associated with the UE 102 (e.g., from the HLR), and propagate the IP address and corresponding MSISDN to downstream network elements (e.g., network gateway 104). In one aspect, on authentication and connection with the communication network 1 (502), the UE 102 can request (e.g., periodically, on demand, based on an event, etc.) a V-SubId 112 that can be utilized in place of a UDID of the device.

When the request from UE 102 is received, a network element (e.g., network gateway 104) within communication network 1 (502) can detect an IP address associated with the UE 102 from the request, and accordingly determine the corresponding MSISDN of the UE 102 associated with the IP address. Moreover, a SubId associated with the MSISDN can be identified and a V-SubId 112 can be generated based on, or independent of, the SubId. Typically, the SubId can be a unique and unchangeable identifier associated with a subscriber of UE 102. In contrast, the V-SubId 112 can change with time (e.g., periodically, on demand, based on an event/schedule, etc.) and/or across data sessions such that subscriber activity monitoring and/or tracking is prevented or impeded. As an example, the V-SubId 112 can be randomly generated, unique, opaque, and/or can be repeated and/or reused (for different UEs). The V-SubId 112 can be transmitted to the UE 102 by the communication network 1 (502) and can be utilized by one or more applications/browsers on the UE 102, during communication over a communication network 2 (504) (and/or communication over the communication network 1 (502)). As an example, the communication network 2 (504) can include a WiFi network. In an aspect, the UE 102 can utilize the V-SubId 112 for communication with trusted entities 106 (e.g., systems and/or servers that are authorized to track/monitor the subscriber/UE 102 activity) and/or untrusted entities 108 (e.g., systems and/or servers that are not authorized to track/monitor the subscriber/UE 102 activity). Accordingly, the V-SubId 112, due to its changing nature, can prevent or impede traceability of the subscriber and/or UE 102, while allowing a network service provider to uniquely identify the subscriber associated with the V-SubId 112, if the need arises (e.g., for law enforcement).

Although communication network 1 (502) is described herein to include a mobility and/or cellular network(s), it is noted that the communication network 1 (502) can include most any communication network (e.g., wired or wireless) that facilitates authentication with UE 102 based on a unique ID/credential associated with the UE 102 and/or subscriber of the UE 102, prior to the UE 102 connecting to and/or accessing the communication network 1 (502). In addition, the communication network 2 (504) is not limited to a WiFi network and can include most any communication network (e.g., wired or wireless). As an example, UE 102 can connect to and/or communicate via communication network 1 (502) and communication network 2 (504) simultaneously and/or at different times.

Figure 6:
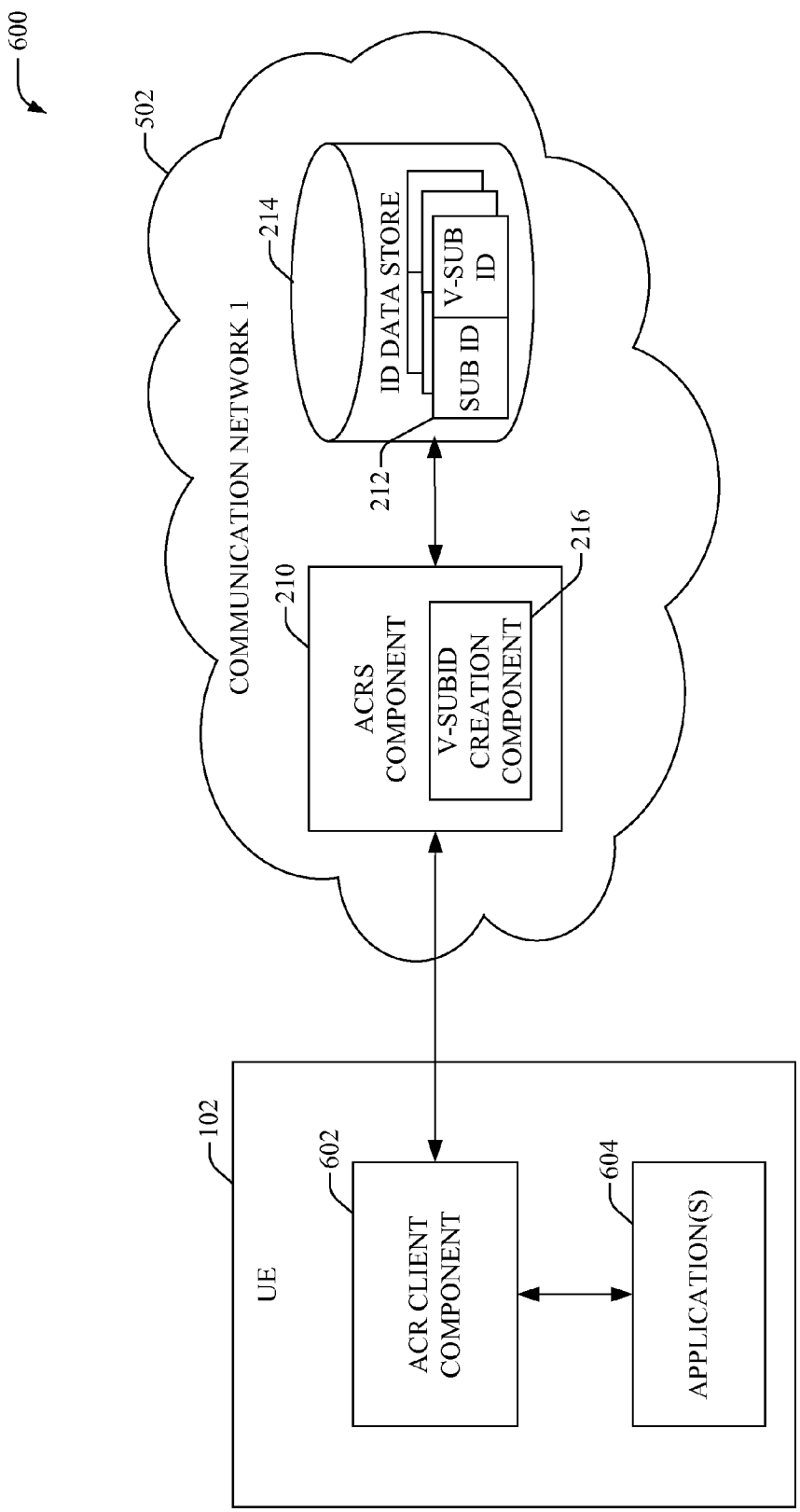
FIG. 6 illustrates an example system that facilitates generation and transmission of V-SubIds over a communication network.

Referring now to FIG. 6, there illustrated is an example system 600 that facilitates generation and transmission of V-SubIds over a communication network, in accordance with an aspect of the subject disclosure. To mitigate the risk of undesired subscriber-behavior tracking by unauthorized systems, system 600 facilitates utilization of a V-SubId in place of a unique device ID associated with UE 102. In an aspect, the V-SubId is generated subsequent to an authentication (e.g., SIM-based authentication) between the UE 102 and a communication network 1 (502) (e.g., a cellular network). For example, the authentication can be performed when the UE 102 is powered on or when the UE 102 enters a coverage area associated with communication network 1 (502). It is noted that the UE 102, ACRS component 210, communication network 1 (502), table(s) 212, ID data store 214, and V-SubId creation component 216 can include functionality as more fully described herein, for example, as described above with regard to systems 100-500.

In one embodiment, the communication network 1 (502) can include the ACRS component 210 that facilitates generation and management of V-SubIds associated with UE 102. Moreover, the V-SubId can be a SIM-based Identifier, for example, an identifier that is generated and/or assigned to the SubId if a SIM, or SIM-based, authentication performed as part of the UE 102's connecting to the communication network 1 (502) is successful. As an example, the V-SubId can include most any random, opaque, and/or unique (for a specific time and/or session) number or code that can change periodically or based on an event/criterion, such as (but not limited to) expiration of a timer, termination of a data session, etc. In an aspect, the V-SubId creation component 216 can generate the V-SubId by employing most any random number generator that can create the V-SubId based on, or independent of, the SubId, MSISDN, UDID, etc. associated with UE 102.

In one aspect, UE 102 can include an anonymous customer reference (ACR) client component 602 that can request a V-SubId from the ACRS component 210, retain the V-SubId received from the ACRS component 210, and provide the V-SubId to an application(s) 604. For example, the ACR client component 602 can request for the V-SubId periodically (e.g., every 24 hours), based on an event (e.g., expiration of a timer) and/or on demand (e.g., when requested by application(s) 604). Moreover, on receiving a request for the V-SubId from the ACR client component 602, the ACRS component 210 can perform a table lookup to determine if a previously generated valid and/or non-expired V-SubId exists for the subscriber of UE 102 and is stored in the one or more tables 212. If a valid and/or non-expired V-SubId is assigned to the subscriber's SubId, the existing V-SubId can be returned to the ACR client component 602 by the ACRS component 210. In contrast, if valid and/or non-expired V-SubId does not exist for the subscriber, the V-SubId creation component 216 can generate a new V-SubId and return the new V-SubId to the ACR client component 602. Additionally or optionally, the V-SubId can be stored at the UE 102 (e.g., by the ACR client component 602) for a specific time period (e.g., 24 hours) to avoid and/or minimize communication between the ACR client component 602 and the ACRS component 210. It is noted that the communication between the ACR client component 602 and the ACRS component 210 is secured based on most any authentication and/or authorization technique(s).

Application(s) 604 can include most any applications that enable the UE 102 to perform a specific task. Typically, application(s) 604 can be pre-installed (e.g., during manufacture or provisioning), downloaded/updated by the UE 102 from a software distribution platform, received via an over-the-air (OTA) update, and the like. As an example, application(s) 604 can also include (but are not limited to) web applications and/or web browsers. In one aspect, during communication (e.g., via communication network 2 (504)) application(s) 604 can include the V-SubId in the communication data. For example, application(s) 604 can extract and/or receive the V-SubId, through an application programming interface (API) provided by the ACR client component 602 and can insert the V-SubId in a header (e.g., Hypertext Transfer Protocol (HTTP) header) and/or body of a communication message. In another example, the V-SubId can be appended to the header and/or body of the communication message. Accordingly, system 600 facilitates utilization and delivery V-SubIds (and not a SubId/UDID) to entity(ies) (e.g., trusted and/or untrusted entities) during a communication between the UE 102 and the entity(ies) via the communication network 2 (504).

Figure 7:
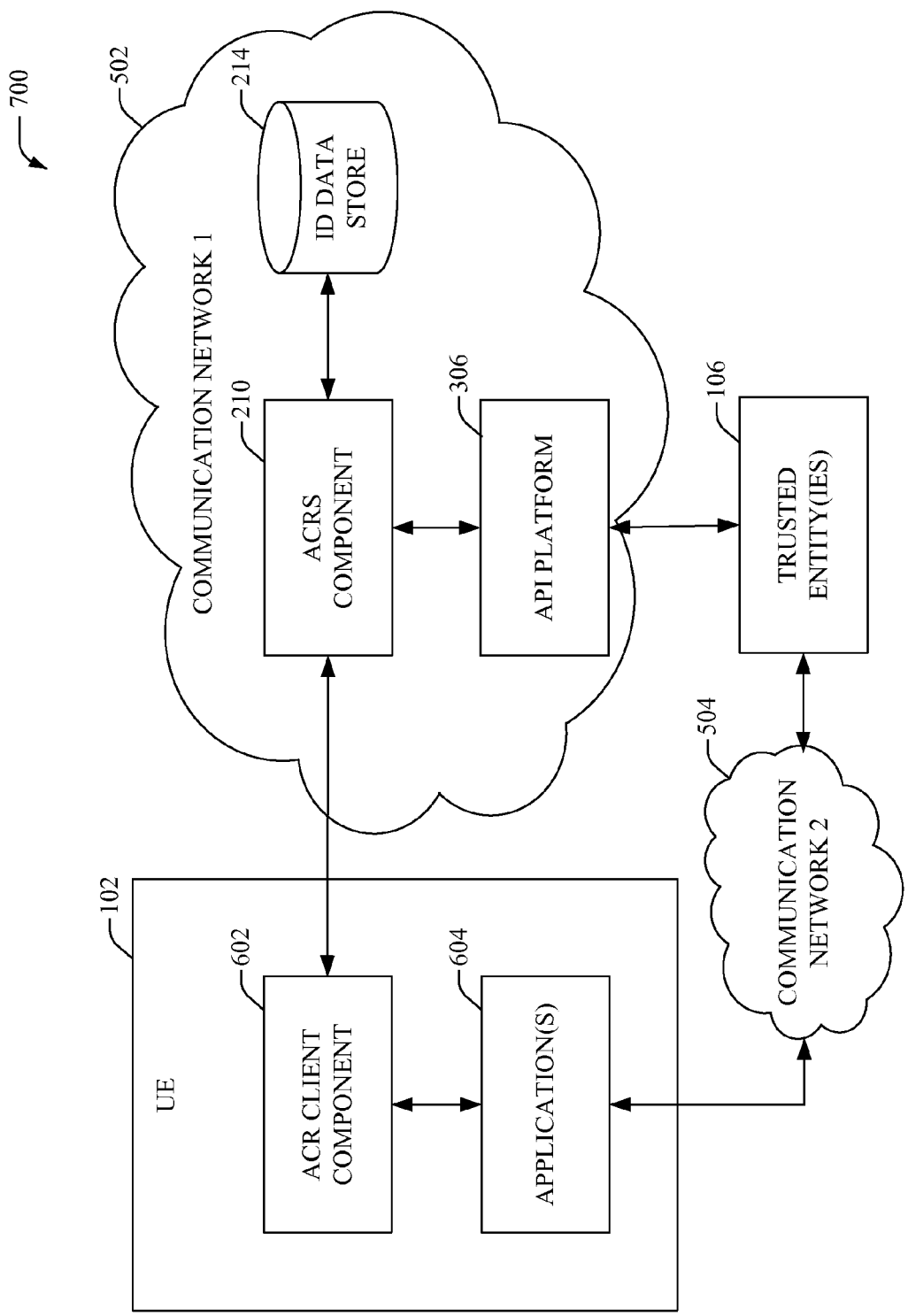
FIG. 7 illustrates an example system that facilitates an exchange of a V-SubId for a SubId by a trusted entity.

Referring now to FIG. 7, there illustrated is an example system 700 that facilitates an exchange of a V-SubId for a SubId by a trusted entity, in one aspect of the subject disclosure. Typically, system 700 can be utilized for providing V-SubIds associated with a subscriber (e.g., in place of a static UDID), to one or more websites, systems, platforms, etc. to facilitate communication with UE 102. It is noted that the UE 102, communication network 1 (502), communication network 2 (504), trusted entity(ies) 106, ACRS component 210, ID data store 214, API platform 306, ACR client component 602, and application(s) 604 can include functionality as more fully described herein, for example, as described above with regard to systems 100-600. As an example, trusted entity(ies) 106 depicted in FIG. 7 can include (but are not limited to) a trusted website, system, network, platform, server, etc., which can be authorized (e.g., by the user and/or service provider) to receive and/or utilize a unique and static identifier (e.g., SubId) associated with the subscriber of UE 102, for example, for implementing value added services. For example, the trusted entity(ies) 106 can utilize the unique and/or static identifier (e.g., SubId) to enable consistent data services and/or provide a seamless service experience across data sessions for the UE 102 (e.g., one-click payment taking advantage of implicit authentication already done as part of the UE 102's logging on and/or connecting to the communication network 1 (502)).

In one aspect, the UE 102 can access the trusted entity(ies) 106 via one or more networked elements/nodes/links in communication network 2 (504). Additionally or alternatively, a trusted entity(ies) 106 (e.g., a trusted website) can be accessed by the applications 604 from a link on an untrusted entity (not shown). As described herein, the V-SubId inserted by the applications 604 in a communication message transmitted from the UE 102 can be received by the trusted entity(ies) 106. As an example, the V-SubId is inserted within a header (e.g., HTTP header) and/or body of a message/request transmitted from the UE 102 to the trusted entity(ies) 106. In one aspect, based on an analysis of the request/message, the trusted entity(ies) 106 can detect that the received ID (e.g., within a header/body of the message/request) is a V-SubId. For example, V-SubIds can have a specific configuration and/or syntax, such as, but not limited to, a predefined code within the first/last N digits/characters (wherein N can be most any positive integer), which can be identified by the trusted entity(ies) 106 to verify that the received ID is a V-SubId.

In one embodiment, the trusted entity(ies) 106 can exchange the V-SubId for a SubId associated with the subscriber via the application programming interface (API) platform 306. As an example, the API platform 306 can receive a query that includes the V-SubId from the trusted entity(ies) 106. In one aspect, the API platform 306 can verify that the trusted entity(ies) 106 is authorized to receive the SubId, for example, based on a URL-based authorization and/or a certificate-based authorization. In response to successful verification, the API platform 306 can query the ACRS component 210 for the SubId. In one aspect, the ACRS component 210 can perform a reverse lookup to retrieve the SubId corresponding to the V-SubId, from the ID data store 214. As an example, the API platform 306 can provide an appropriate interface (e.g., Representational state transfer (RESTful) interface, Simple Object Access Protocol (SOAP) interface, etc.) to facilitate secure communication between the trusted entity(ies) 106 and the ACRS component 210.

In an aspect, communication network 1 (502) can include (but is not limited to) a cellular network and communication network 2 (504) can include (but is not limited to) a WiFi network. However, communication network 1 (502) and/or communication network 2 (504) are not limited to wireless networks and can include most any wired communication network. Further, although it is depicted in FIG. 7 as residing outside communication network 1 (502) and communication network 2 (504), the trusted entity(ies) 106 can be included within communication network 1 (502) or communication network 2 (504). Additionally or alternatively, in one example aspect, trusted entity(ies) 106 can include (but are not limited to) at least a portion of application(s) 604 on the UE 102. In this example aspect, trusted entity(ies) 106 can retrieve the SubId corresponding to the V-SubId, via secure communication with the API platform 306 over communication network 1 (502) and/or communication network 2 (506). As an example, the API platform 306 can authenticate (e.g., based on URL data, security certificates, etc.) the trusted entity(ies) 106 prior to providing the SubId to the trusted entity(ies) 106, to prevent access by an untrusted entity.

Figure 8:
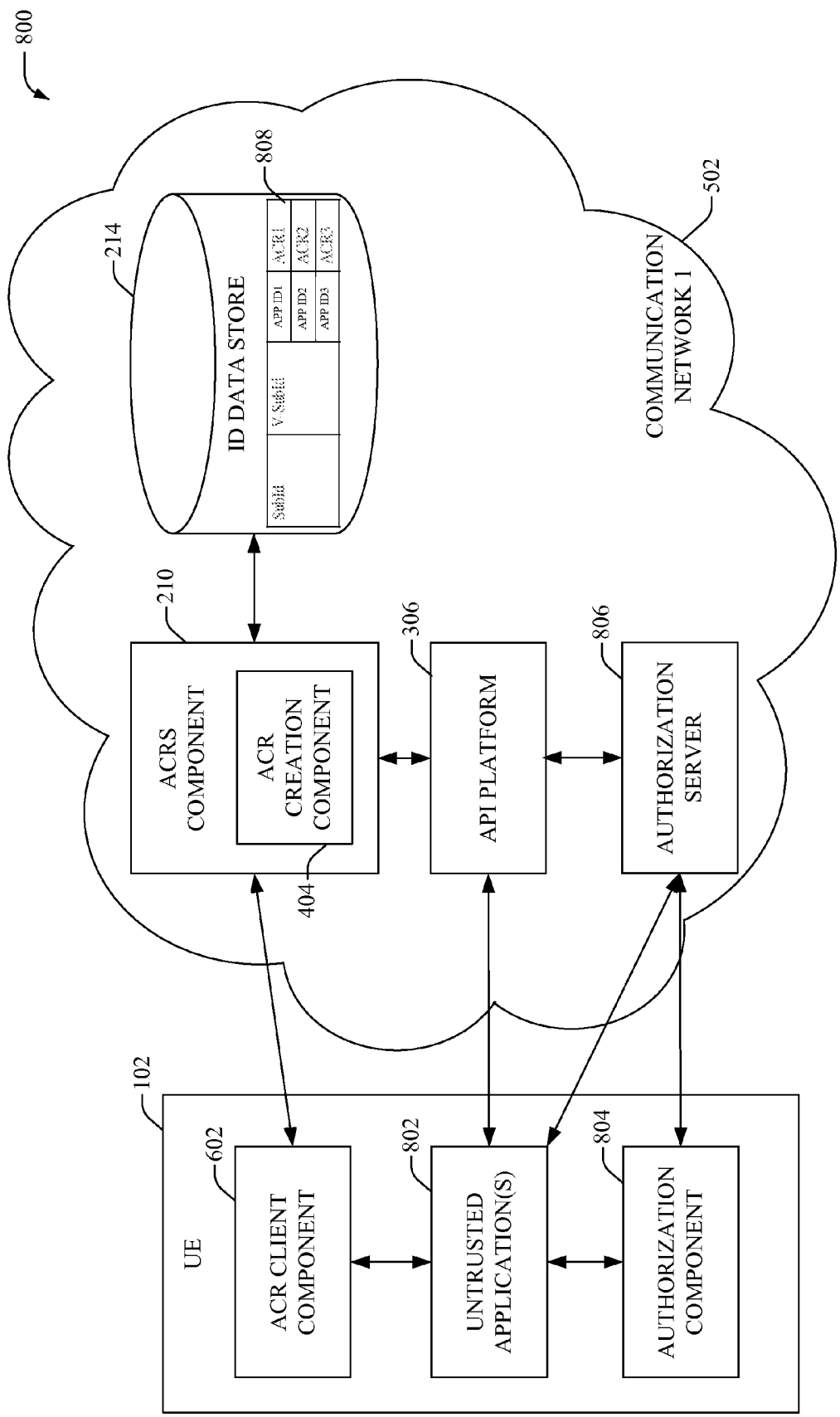
FIG. 8 illustrates an example system that facilitates management of an application-specific ACR.

FIG. 8 illustrates an example system 800 that facilitates generation and management of an application-specific ACR, in one aspect of the subject innovation. Typically, system 800 can facilitate exchange of a V-SubId for an application-specific ACR (static and/or dynamic) based on a subscriber's authorization. Moreover, the system 800 enables a user to specify and/or authorize an application to receive, subsequent to a SIM (or SIM-based) authentication, an ID (ACR) that is assigned to the application for a specific time period (instead of a V-SubId). The UE 102, communication network 1 (502), ACRS component 210, ACR creation component 404, ID data store 214, ACR client component 602, and API platform 306 can include functionality as more fully described herein, for example, as described above with regard to systems 100-700.

In one aspect, the API platform 306 provides an interface for untrusted application(s) 802 to make a request for an ACR (static and/or dynamic) based on user authorization. As an example, untrusted application(s) 802 can be substantially similar to application(s) 604 and can include functionality as more fully described herein, for example, as described above with regard to application(s) 604. Moreover, untrusted application(s) 802 can include most any applications (e.g., third-party applications) that are not authorized to access a device ID and/or SubId associated with the UE 102. In an aspect, the ACR creation component 404 can generate application-specific ACRs (static and/or dynamic), in response to receiving a request for an ACR from the untrusted application(s) 802. As an example, the ACR can include most any random number or code that can be based on, or independent of, a SubId/UDID/MSISDN associated with UE 102. Moreover, an ACR (static and/or dynamic) can be specific to an untrusted application (e.g., customized/tailored based on data associated with the untrusted application). In one aspect, the untrusted application(s) 802 can obtain user authorization to request the ACR via authorization component 804. As an example, the authorization component 804 can request and receive user approval via an input/output interface (not shown) of UE 102. In one aspect, the authorization component 804 can facilitate communication between the UE 102 and an authorization server 806 within the communication network 502. For example, the authorization component 804 can provide data indicative of the user approval to the authorization server 806, which in turn can communicate with the untrusted application(s) 802 to deliver data such as (but not limited to) an authorization token to the untrusted application(s) 802. On obtaining the authorization token, the untrusted application(s) 802 can communicate with the API platform 306 (e.g., via one or more network servers) to facilitate retrieval of the ACR. Moreover, the API platform 306 can verify the authorization token by communication with the authorization server 806 and query the ACRS component 210 for the ACR in response to the authorization token being verified. As an example, the communication with the authorization server 806 to facilitate authorization can employ (but is not limited to) an OAuth-flow that is used to ensure subscriber's authorization for the ACR request by the untrusted application(s) 802. It is noted that the subject disclosure is not limited to the OAuth protocol, and most any communication protocol can be utilized for authorization.

The ACR creation component 404 can generate the ACR for the untrusted application(s) 802 and store the ACR in a table 808 within the ID data store 214. In one example, the ACR creation component 404 can generate an application-specific ACR (static and/or dynamically changing) by applying a cryptographic hash function to a string composed from data identifying the untrusted application(s) 802 and the subscriber's SubId. Since the ACR is corresponds to a specific untrusted application, correlation of user requests between different applications and/or tracking based upon that correlation (without further explicit correlating information provided by the user to each application) can be impeded and/or prevented. As an example, the cryptographic hash function can be a one-way hash, such that the value of the SubId cannot be determined by an unauthorized entity based on analyzing the ACR. Accordingly, unauthorized determination of the SubId by the untrusted entity(ies) 108 can be impeded and/or prevented.

In another example, the ACR creation component 404 can generate an application-specific static (e.g., remains constant until deleted by user/application) ACR by applying an encryption algorithm to the SubId. Moreover, the encryption algorithm can employ a pre-provisioned encryption key that is specific to the untrusted application(s) 802. Moreover, different encryption keys can be utilized for different untrusted applications. For example, the encryption key can be based on the address data (e.g., FQDN, IP address, URL, etc.) associated with a network server (e.g., app server) associated with the untrusted application(s) 802. The resulting ACR is unique to the combination of the untrusted application(s) 802's address data and the SubId associated with the UE 102. Accordingly, the ACR creation component 404 generates different ACRs for different applications and thus cross-domain profiling between the different applications can be impeded and/or prevented.

In yet another example, the ACR creation component 404 can generate a unique, dynamic, and application-specific ACR based upon data (e.g., address data) associated with the untrusted application(s) 802. Moreover, in this example scenario the ACR is not static, and the ACR creation component 404 generates a new ACR for the same untrusted application(s) 802 over time (e.g., periodically, based on an event, on demand, per request, etc.). The dynamic ACR reduces snooping, replay attacks, and other such security risks. In this example, the ACR creation component 404 can apply an encryption algorithm to the SubId associated with UE 102 using a dynamic encryption key. The algorithm for selection of the dynamic encryption key can vary based on the untrusted application(s) 802, and can employ different schedules for advancement to a new key value to generate a new ACR. At any given time, the dynamic ACR is unique to the combination of the data associated with the untrusted application(s) 802 and the SubId associated with the UE 102. As an example, the dynamic ACR can be encrypted (e.g., by ACR creation component 404) in a manner such that a trusted entity can decrypt the dynamic ACR to identify the SubId of the UE 102 and an untrusted entity (e.g., application) can decrypt the dynamic ACR to identify a static application-specific (e.g., constant) ACR assigned to the application 802. As an example, different decryption data (e.g., keys) can be provided to (e.g., by the ACRS component 210 and/or via out of band means) the trusted entity and untrusted entity to facilitate the above decryption. It is noted that the subject disclosure is not limited to the above noted ACR generation techniques/algorithms and that the ACR creation component 404 can utilize most any technique to generate a static and/or periodically changing application-specific ACR.

Subsequent to the ACR being generated (e.g., by the ACR creation component 404), the ACRS component 210 can provide the ACR to the API platform 306 and/or the ACR client component 602, for servicing subsequent requests for ACR from the untrusted application(s) 802. As an example, the expiration time associated with the ACR can be specified by the user during authorization (e.g., via authorization component 804), set by the encryption algorithm, and/or can be set to a code (e.g., "999") that indicates that the ACR will not expire unless explicitly requested by the subscriber and/or the untrusted application(s) 802. Further, the untrusted application(s) 802 and/or subscriber (via UE 102) can request an ACR cancellation through API platform 306. As an example, OAuth-flow (e.g., via authorization component 804) can be employed to provide the subscriber's authorization for the ACR cancellation, if requested by the untrusted application(s) 802 (e.g., the same authorization token that was utilized to create the ACR can be reused to cancel the ACR). Moreover, on receiving the ACR cancellation request (e.g., authorized by the subscriber), the ACRS component 210 can remove the ACR from the table 808 and notify the untrusted application(s) 802 and/or the ACR client component 602 of the cancelled ACR.

Figure 9:
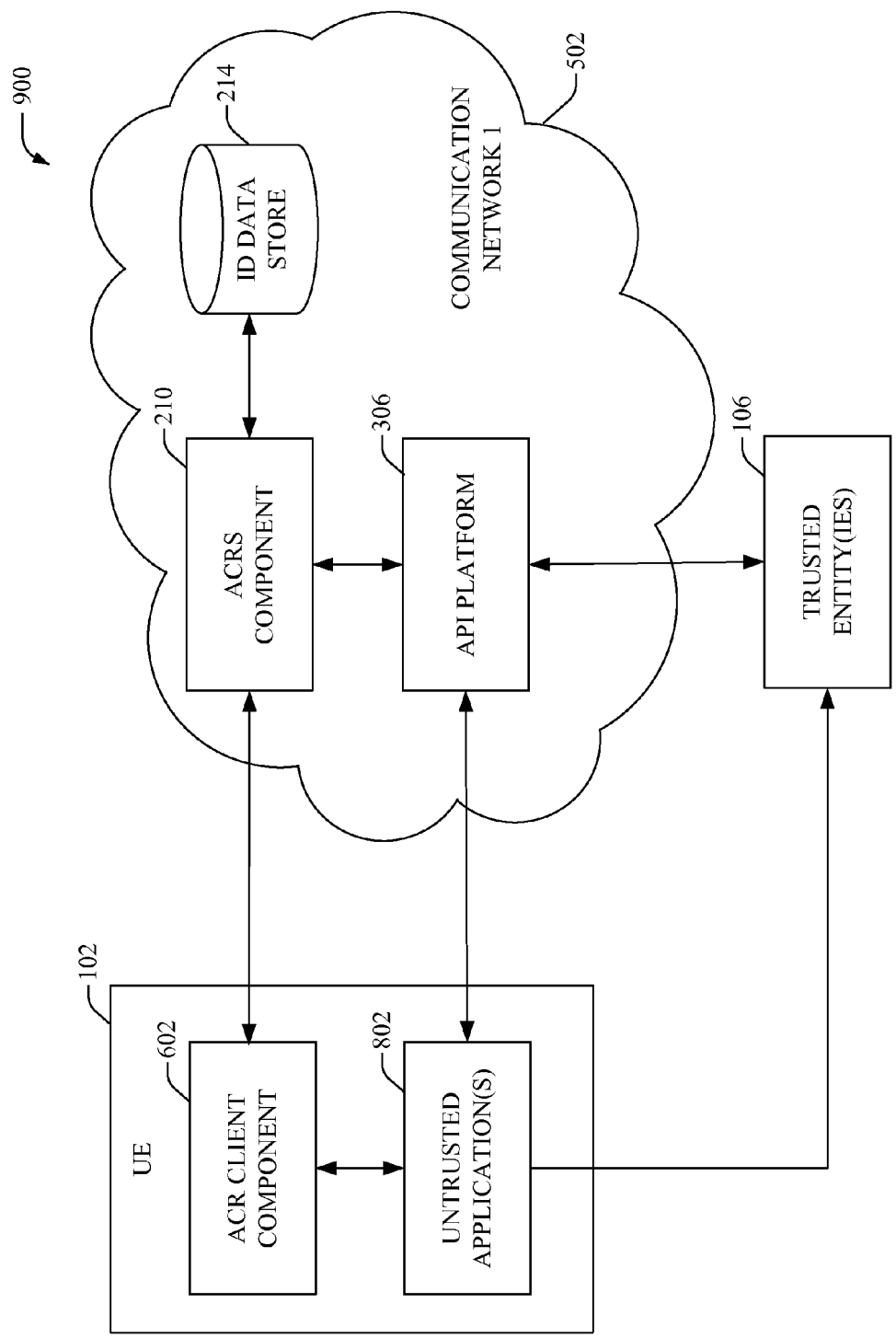
FIG. 9 illustrates an example system that facilitates exchange of application-specific ACRs for SubIds.

Referring now to FIG. 9, there illustrated is an example system 900 that facilitates exchange of application-specific ACRs for SubIds, in one aspect of the subject innovation. Typically, the UE 102, trusted entity(ies) 106, ACRS component 210, ID data store 214, ACR client component 602, API platform 306, and untrusted applications 802 can include functionality as more fully described herein, for example, as described above with regard to systems 100-800.

In this embodiment, initially the ACR client component 602 provides a V-SubId (e.g., in place of a UDID/SubId) to the untrusted applications 802. As described herein with respect to system 800, the untrusted applications 802 can exchange the V-SubId for an ACR via API platform 306, based on user approval (e.g., via communication with the authorization server 806). On receiving user approval, the ACRS component 210 can create (e.g., by employing the ACR creation component 404) and/or store respective ACRs for the untrusted applications 802 in ID data store 2146. In one example, the ACRs (static and/or dynamic) can be utilized by the ACR client component 602 for subsequent requests from the untrusted applications 802, for example, until deleted and/or cancelled by the subscriber and/or the untrusted applications 802.

As an example, the untrusted applications 802 can provide the ACR to a trusted entity(ies) 106 (e.g., trusted websites, servers, systems, etc.) during communication with the trusted entity(ies) 106 via one or more networked elements/nodes/links of most any communication network (e.g., communication network 2 (504)). In one aspect, based on an analysis of the communication, the trusted entity(ies) 106 can detect that the received ID (e.g., within a header/body of the message/request) is an ACR. For example, the ACR can include a predefined code, for example, within the first/last N digits/characters (wherein N can be most any positive integer), which can be identified by the trusted entity(ies) 106, accessed via untrusted application(s) 802, to verify that the received ID is an ACR. As an example, the trusted entity(ies) 106 can determine the SubId associated with the ACR by communication with the ACRS component 210 via the API platform 306 and/or by analyzing (e.g., decrypting) the ACR.

In one example, if the ACR is generated (e.g., by the ACR creation component 404) by employing a one-way hash, the trusted entity(ies) 106 cannot extract the SubId from the ACR. In this example scenario, the trusted entity(ies) 106 can query the API platform 306 for the SubId corresponding to the ACR. On receiving the query, the API platform 306 can verify that the trusted entity is authorized to receive the SubId (e.g., based on a URL associated with the trusted entity) and on successful verification, query the ACRS component 210 for the SubId. In one aspect, the ACRS component 210 can perform a reverse lookup to retrieve the SubId corresponding to the ACR, from the ID data store 214. The retrieved SubId can be provided to the trusted entity(ies) 106 via the API platform 306.

In another example, if the ACR is generated (e.g., by the ACR creation component 404) by employing an encryption algorithm with a pre-provisioned encryption key, the trusted entity(ies) 106 can receive from the ACRS component 210 a decryption key corresponding to the a pre-provisioned encryption key (e.g., using out-of-band means). Further, the trusted entity(ies) 106 can decrypt the ACR by employing the decryption key to obtain the SubId associated with UE 102. In yet another example, if the ACR is generated (e.g., by the ACR creation component 404) by employing a dynamic encryption key algorithm that employs an encryption key that changes over time, the trusted entity(ies) 106 can receive from the ACRS component 210, the dynamic encryption key algorithm (e.g., using out-of-band means). The trusted entity(ies) 106 can decrypt the ACR based on the dynamic encryption key algorithm to obtain the SubId associated with UE 102.

Consider a non-limiting example scenario, wherein the user accesses an untrusted application 802, for example, a weather application, and/or a weather website (www.weather.com) through a browser application on the UE 102. An app server and/or web server associated with the weather application and/or website (www.weather.com) can be provided with an application-specific ACR, during communication with the UE 102 to impede and/or prevent cross-application monitoring and/or tracking of user activity. In one aspect, the app server and/or web server can further communicate with a trusted entity(ies) 106, such as an advertisement (ad) server within a service provider's network. In this example, the ad server can communicate with the API platform 306 to exchange the ACR for a SubId associated with the user and/or receive a decryption key/dynamic encryption key algorithm (e.g., via out-of-band means) to calculate the SubId from the ACR. Once the decryption key/dynamic encryption key algorithm is received, the ad server can identify the SubId for subsequent ACRs received in subsequent messages without communicating with the API platform 306. As an example, the ad server can utilize the SubId data to identify user preferences and/or interests and select one or more ads based on the user preferences and/or interests. Further, the ad server can provide the one or more ads to the app server and/or web server.

Figure 10:
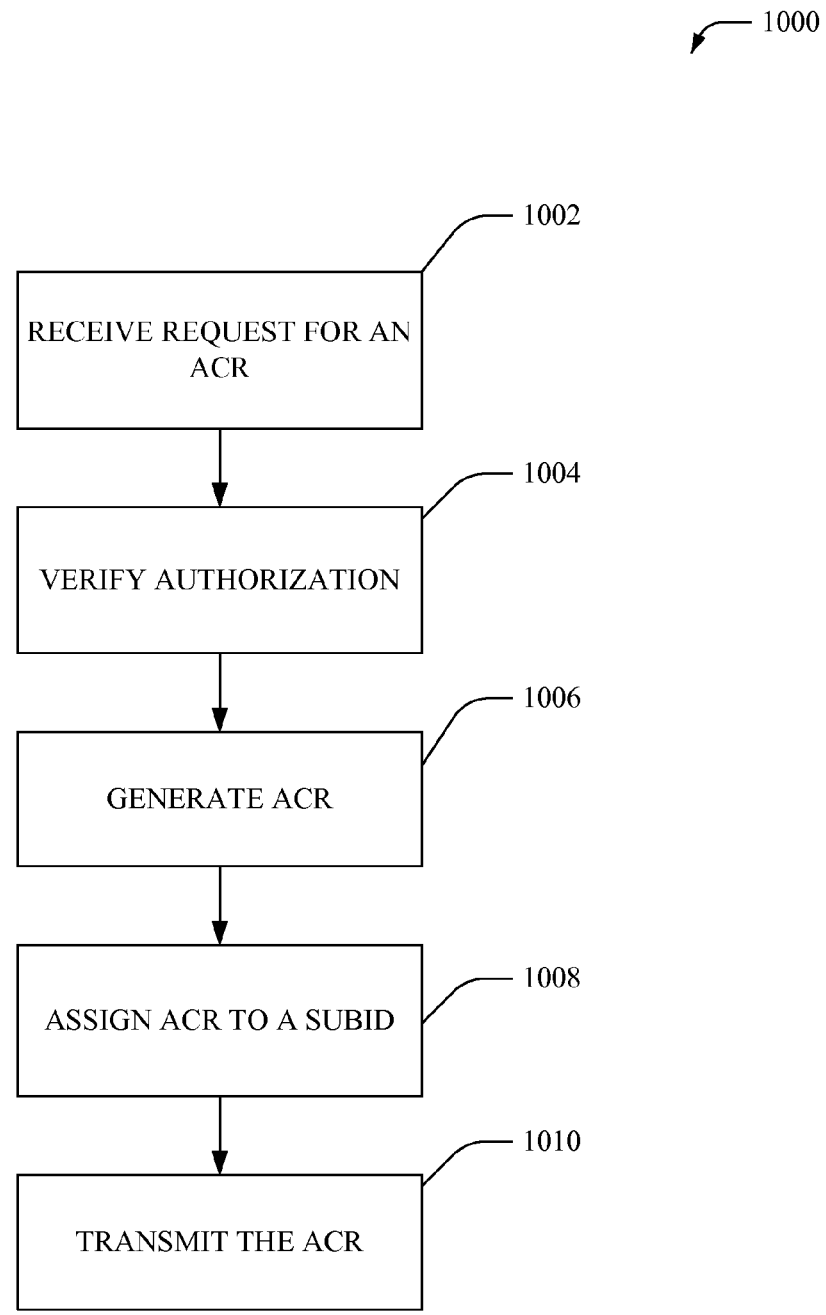
FIG. 10 illustrates an example method that facilitates generation of an ACR.

FIGS. 10-13 illustrate flow diagrams and/or methods in accordance with the disclosed subject matter. For simplicity of explanation, the flow diagrams and/or methods are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts may be required to implement the flow diagrams and/or methods in accordance with the disclosed subject matter. In addition, those skilled in the art will understand and appreciate that the methods could alternatively be represented as a series of interrelated states via a state diagram or events. Additionally, it should be further appreciated that the methods disclosed hereinafter and throughout this specification are capable of being stored on an article of manufacture to facilitate transporting and transferring such methods to computers. The term article of manufacture, as used herein, is intended to encompass a computer program accessible from any computer-readable device or computer-readable storage/communications media.

Referring now to FIG. 10, illustrated is an example method 1000 that facilitates generation of an ACR, according to an aspect of the subject disclosure. As an example, method 1000 can be implemented within a telecommunication network to deter, impede and/or prevent tracking of subscriber activity by unauthorized entities. Further, method 1000 can facilitate an exchange of a V-SubId for an application-specific ACR based on a user authorization. As an example, the ACR can be a static (non-changing) or dynamic identifier and can be utilized by an application instead of a UDID associated with a UE and/or during header enrichment by a network node.

At 1002, a request for an ACR can be received (e.g., by the ACRS component 210). For example, an untrusted entity (e.g., an application server, a web server, etc.) can request for a device/subscriber identifier instead of a V-SubId to remember a UE and provide consistent data services and/or a seamless service experience across data sessions associated with the UE. At 1004, user authorization can be verified (e.g., by authorization component). If a user, via an interface on the UE, approves ACR generation, at 1006, an ACR can be generated (e.g., by ACR creation component 404). As an example, the ACR can be generated based in part on the SubId associated with the user and/or address data (e.g., URL, FQDN, URI, etc.) associated with the untrusted entity. The ACR can be static (non-changing) and/or can be dynamically updated (e.g., based on an encryption algorithm). At 1008, the ACR can be assigned to the SubId associated with a UE (e.g., by the ACRS component 210). Further, at 1010, the ACR can be transmitted to the untrusted entity (e.g., by the API platform 306, the ACR client component 602, and/or the network gateway 104).

Figure 11:
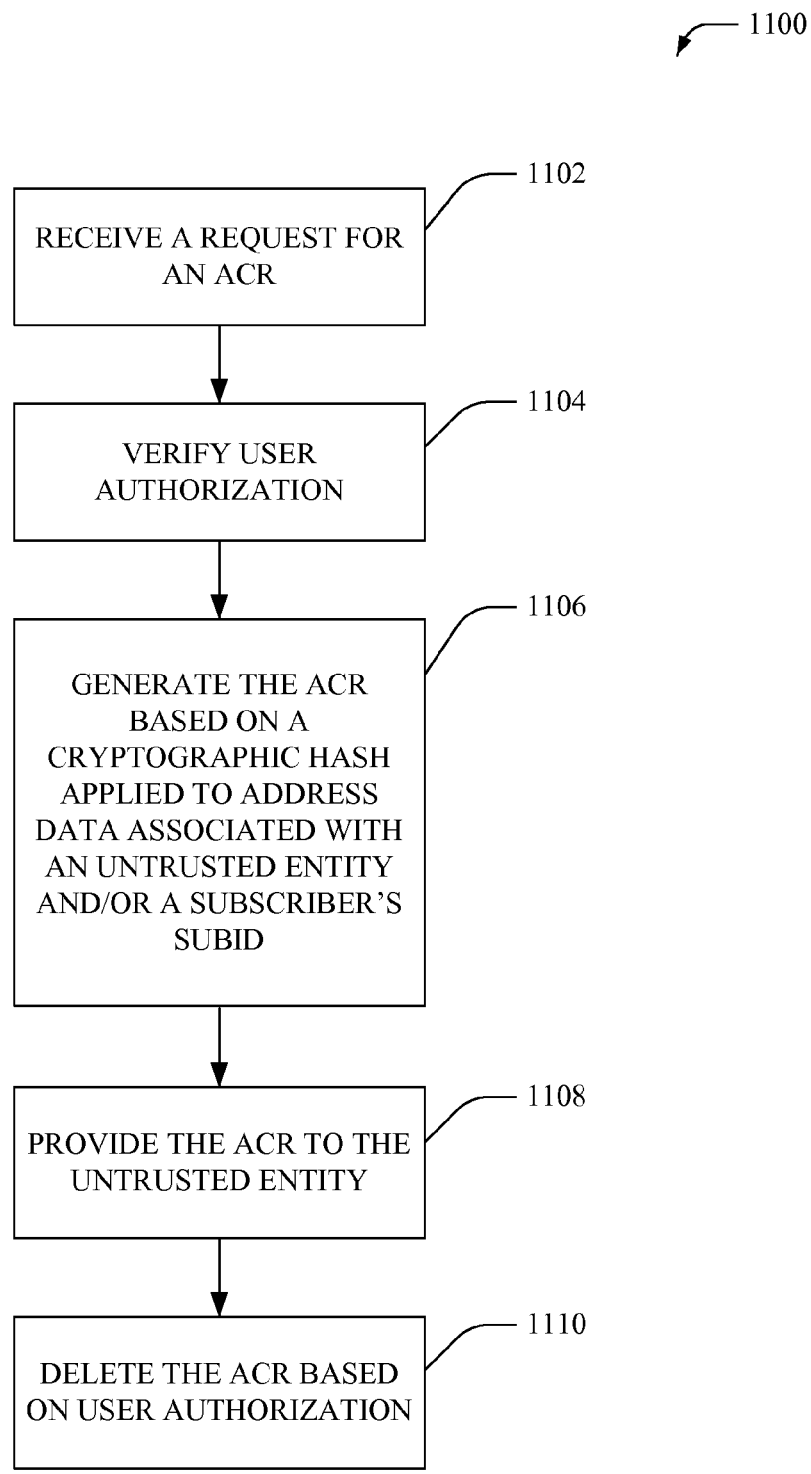
FIG. 11 illustrates an example method that facilitates utilization of a cryptographic hash for generating an ACR.

FIG. 11 illustrates an example method 1100 that facilitates utilization of a cryptographic hash for generating an ACR, according to an aspect of the subject disclosure. At 1102, a request for an ACR can be received (e.g., by the ACRS component 210). For example, an untrusted entity (e.g., an application server, a web server, etc.) can request for a device/subscriber identifier instead of a V-SubId to remember a UE and provide consistent data services and/or a seamless service experience across data sessions. At 1104, user authorization can be verified (e.g., by authorization component). For example, user authorization can be received via an interface on the UE. At 1106, the ACR can be generated (e.g., by ACR creation component 404) based on applying a cryptographic hash function to a string determined based on the untrusted entity(ies) 108's address and/or the subscriber's SubId. Since the ACR is corresponds to a specific untrusted entity, cross-service correlation of user requests and/or tracking based upon that correlation (without further explicit correlating information provided by the user to each site) can be impeded and/or avoided. As an example, the cryptographic hash function can be a one-way hash, such that the value of the SubId cannot be calculated from the ACR. Accordingly, unauthorized determination of a SubId by the untrusted entity can be impeded and/or prevented. However, if the ACR is communicated from the untrusted entity to a trusted entity, the trusted entity can exchange the ACR for the SubId over a secure communication with the ACRS component 210.

At 1108, the ACR can be provided to the untrusted entity (e.g., by the ACRS component 210). Moreover, the same ACR can be utilized for subsequent communication from the UE to the untrusted entity. In one aspect, at 1110 the ACR can be deleted based on user authorization. On deletion of the ACR, the untrusted entity can be provided with a new V-SubId each time the UE accesses the untrusted entity.

Figure 12:
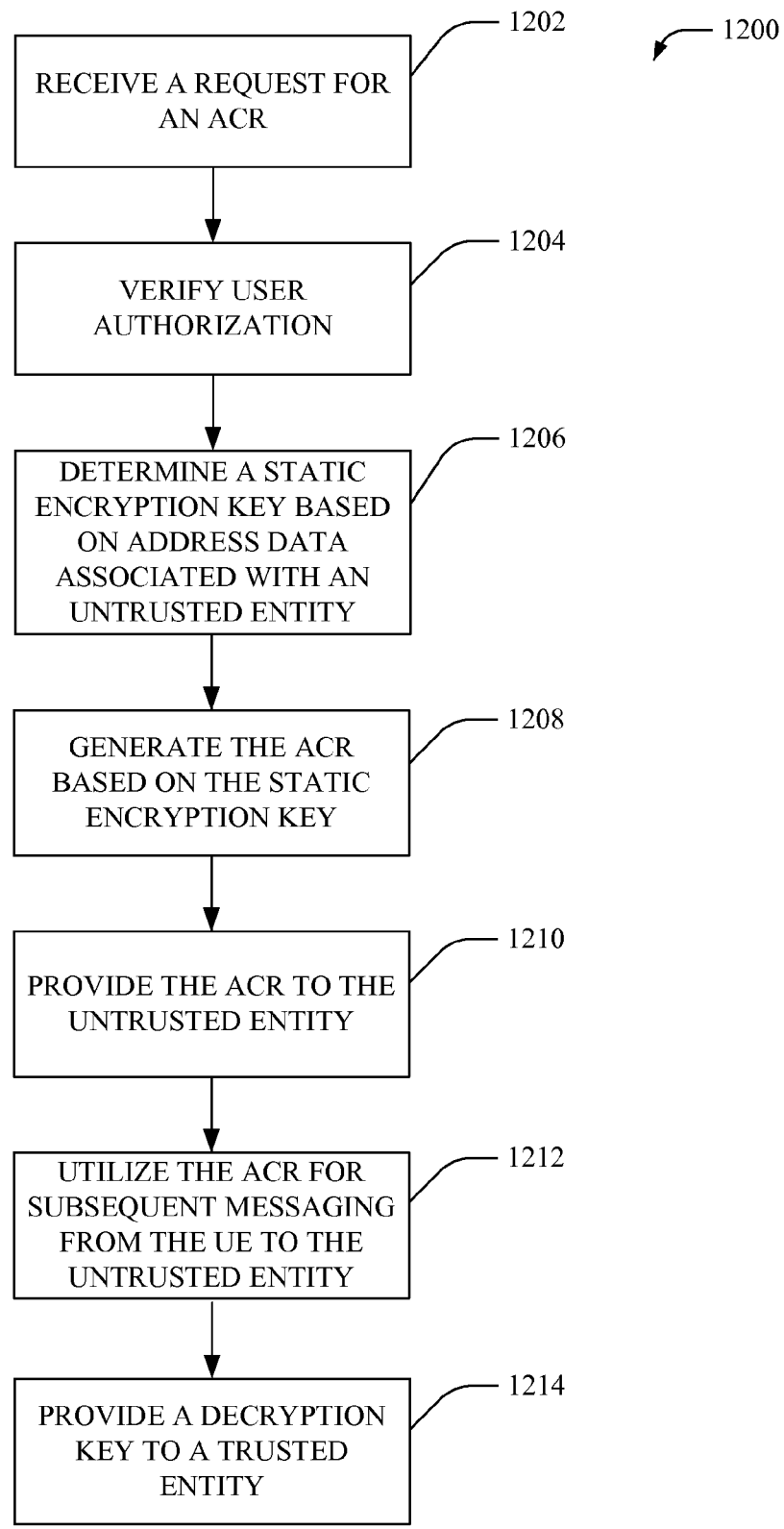
FIG. 12 illustrates an example method that facilitates generation of an ACR based on a static encryption key.

Referring now to FIG. 12, there illustrated is an example method 1200 that facilitates generation of an ACR based on a static encryption key, according to an aspect of the subject disclosure. At 1202, a request for an ACR can be received (e.g., by the ACRS component 210) from an untrusted entity (e.g., an application server, a web server, etc.). In an aspect, the untrusted entity can utilize the ACR to track user behavior over time and provide consistent data services and/or a seamless service experience across data sessions. At 1204, user authorization can be verified (e.g., by the authorization component). For example, user authorization can be received via an interface on the UE.

At 1206, a static encryption key can be determined (e.g., by the ACRS component 210) based on address data (e.g., FQDN, IP address, URL, etc.) associated with the untrusted entity. Further, at 1208, the ACR can be generated (e.g., by the ACR creation component 404) based on the static encryption key. Moreover, the generated ACR is unique to the combination of the untrusted entity's address and/or the SubId, and can thus impede and/or prevent cross-domain profiling. At 1210, the ACR can be provided to the untrusted entity (e.g., by the ACRS component 210). At 1212, the ACR can be utilized as a device/subscriber identifier for subsequent messaging from the UE to the untrusted entity (e.g., until the ACR expires and/or is cancelled by the user/untrusted entity). Accordingly, the untrusted entity can track user behavior, but cross-domain tracking and/or profiling by an unauthorized entity can be impeded/prevented.

Furthermore, at 1214, a decryption key (and/or password) corresponding to the encryption key can be transmitted to one or more trusted entities. As an example, the decryption key can be provided to the one or more trusted entities via a secure communication at most any time, for example, on creation of the ACR, on receipt of a request from the one or more trusted entities, on demand, on detection of an event, etc. In another example, the decryption key can be provided to the one or more trusted entities via out-of-band means. In one aspect, the one or more trusted entities can utilize the decryption key to decrypt the ACR received from the untrusted entity and determine the SubId associated with the UE.

Figure 13:
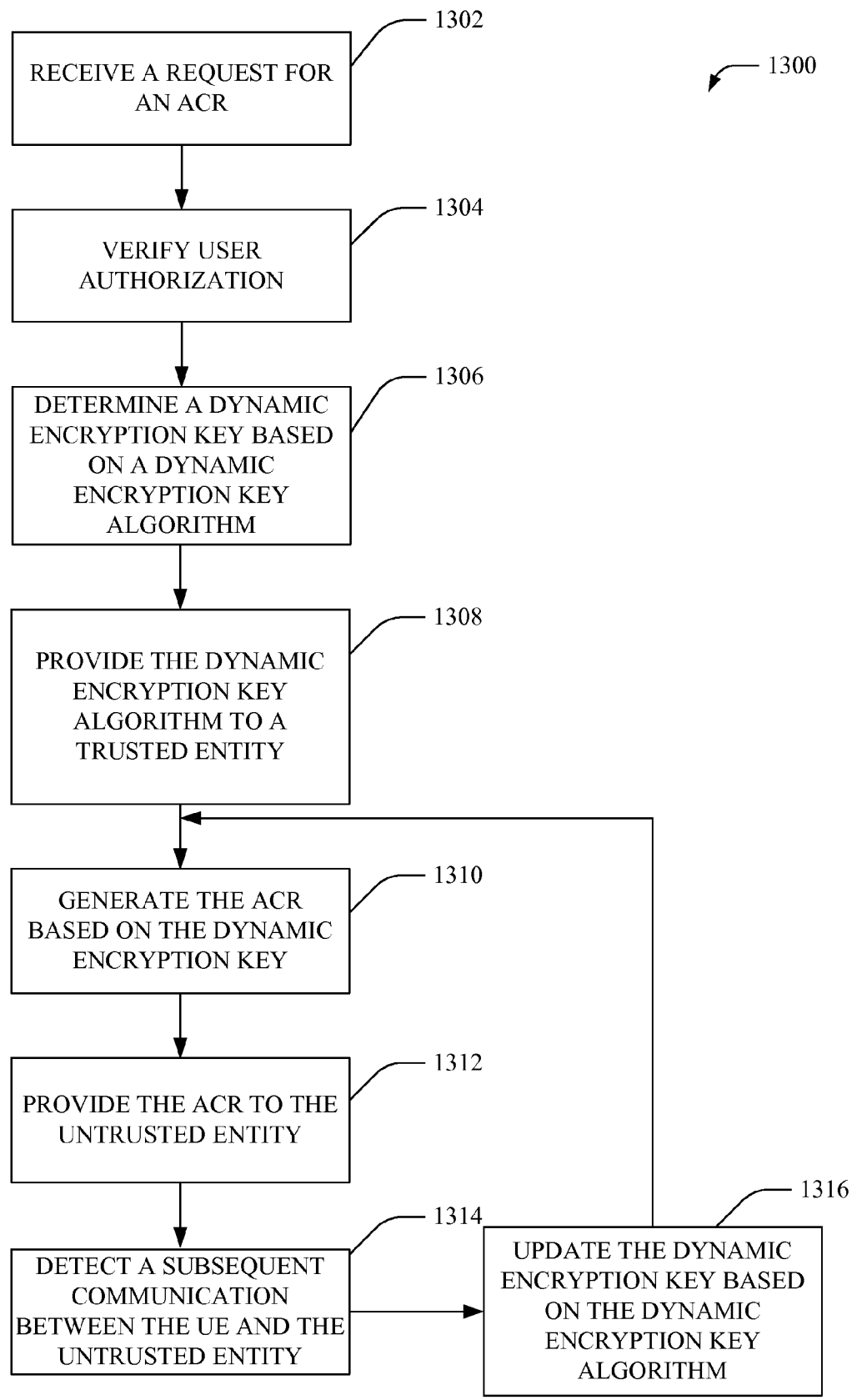
FIG. 13 illustrates an example method that facilitates generation of an ACR based on a dynamic encryption key.

FIG. 13 illustrates an example method 1300 that facilitates generation of an ACR based on a dynamic encryption key, according to an aspect of the subject disclosure. At 1302, a request for an ACR can be received (e.g., by the ACRS component 210) from an untrusted entity (e.g., an application server, a web server, etc.). In an aspect, the untrusted entity can utilize the ACR to track user behavior over time, for example, to remember user preferences. At 1304, user authorization can be verified (e.g., by the authorization component). Moreover, user authorization can be received via an interface on the UE.

In one aspect, at 1306, a dynamic encryption key can be determined (e.g., by the ACR creation component 404) based on a dynamic encryption key algorithm. As an example, the dynamic encryption key algorithm is utilized for selection of the dynamic encryption key, and can vary based on the untrusted entity and/or employ different schedules for advancement to a new key value. At 1308, the dynamic encryption key algorithm can be provided to one or more trusted entities via a secure communication. Additionally or alternatively, an untrusted entity can also be provided with another the dynamic encryption key algorithm (e.g., in response to receiving user authorization), that enables the untrusted entity to determine a static (constant) site/service/application-specific ACR based on the dynamically changing ACR. In one example, the dynamic encryption key algorithm(s) can be provided to the one or more trusted entities and/or the untrusted entity at most any time, for example, on creation of the ACR, on receipt of a request from the one or more trusted entities and/or untrusted entity, on demand, on detection of an event, etc. In another example, the dynamic encryption key algorithm(s) can be provided to the one or more trusted entities and/or the untrusted entity via out-of-band means. In one aspect, the one or more trusted entities can utilize the dynamic encryption key algorithm to identify the SubId associated with UE based on decrypting the ACR within a communication received from the untrusted entity.

Further, at 1310, the ACR can be generated (e.g., by the ACR creation component 404) based on the dynamic encryption key. As an example, the dynamic ACR is unique to the combination of the untrusted entity's address and/or the SubId associated with the UE. At 1312, the ACR can be provided to the untrusted entity. Further, at 1314, a subsequent communication between the UE and the untrusted entity can be detected. In response, at 1316, the dynamic encryption key can be updated based on the dynamic encryption key algorithm and the method can return to 1310, at which a new ACR can be generated.

Figure 14:
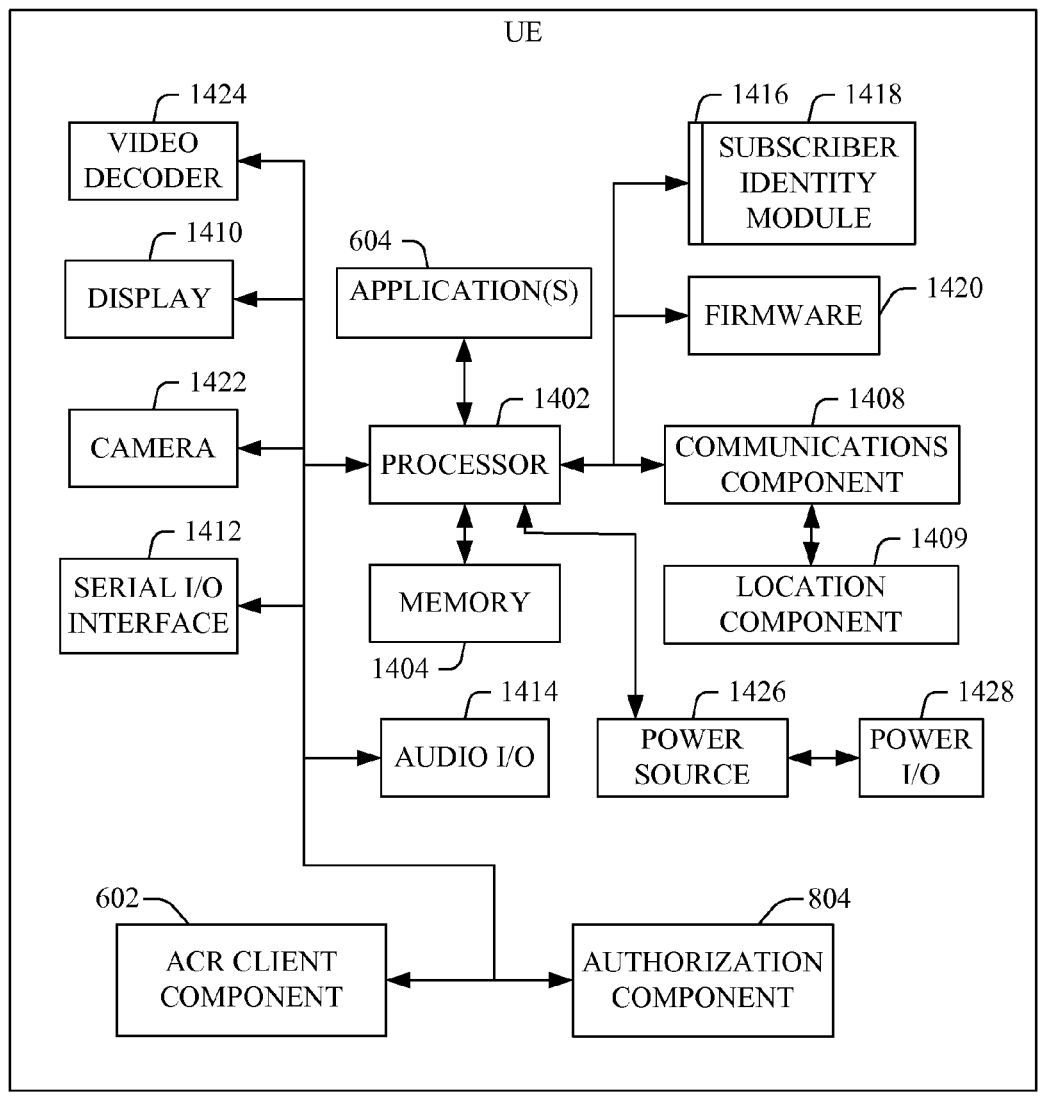
FIG. 14 illustrates an example block diagram of a user equipment suitable for preventing or impeding unauthorized tracking subscriber activity over different domains based on utilization of ACRs.

Referring now to FIG. 14, there is illustrated a block diagram of a UE 1400 that prevents or impedes unauthorized tracking subscriber activity based on utilization of V-SubIds/ACRs in accordance with the subject specification. In addition, the UE 1400 can be substantially similar to and include functionality associated with UE 102 described herein. In one aspect, the UE 1400 can include a processor 1402 for controlling all onboard operations and processes. A memory 1404 can interface to the processor 1402 for storage of data (e.g., including V-SubIds/ACRs) and one or more applications 604 being executed by the processor 1402. A communications component 1408 can interface to the processor 1402 to facilitate wired/wireless communication with external systems (e.g., communication network 1 (502) and/or communication network 2 (504)). The communications component 1408 interfaces to a location component 1409 (e.g., GPS transceiver) that can facilitate location detection of the UE 1400.

The UE 1400 can include a display 1410 for displaying content downloaded and/or for displaying text information related to operating and using the device features. A serial I/O interface 1412 is provided in communication with the processor 1402 to facilitate serial communication (e.g., USB, and/or IEEE 1394) via a hardwire connection. Audio capabilities are provided with an audio I/O component 1414, which can include a speaker for the output of audio signals related to, for example, recorded data or telephony voice data, and a microphone for inputting voice signals for recording and/or telephone conversations.

Further, the UE 1400 can include a slot interface 1416 for accommodating a subscriber identity module (SIM) 1418. As an example, data from the SIM 1418 can be utilized to facilitate authentication with communication network 1 (502), based on which a V-SubId/ACR can be received by the UE 1400. Firmware 1420 is also provided to store and provide to the processor 1402 startup and operational data. The UE 1400 can also include an image capture component 1422 such as a camera and/or a video decoder 1424 for decoding encoded multimedia content. Further, the UE 1400 can include a power source 1426 in the form of batteries, which power source 1426 interfaces to an external power system or charging equipment via a power I/O component 1428. In addition, the UE 1400 can include an ACR client component 602, application(s) 604, and authorization component 804, which can be stored in memory 1404 and can include respective functionality, as more fully described herein, for example, with regard to systems 100-900.

Figure 15:
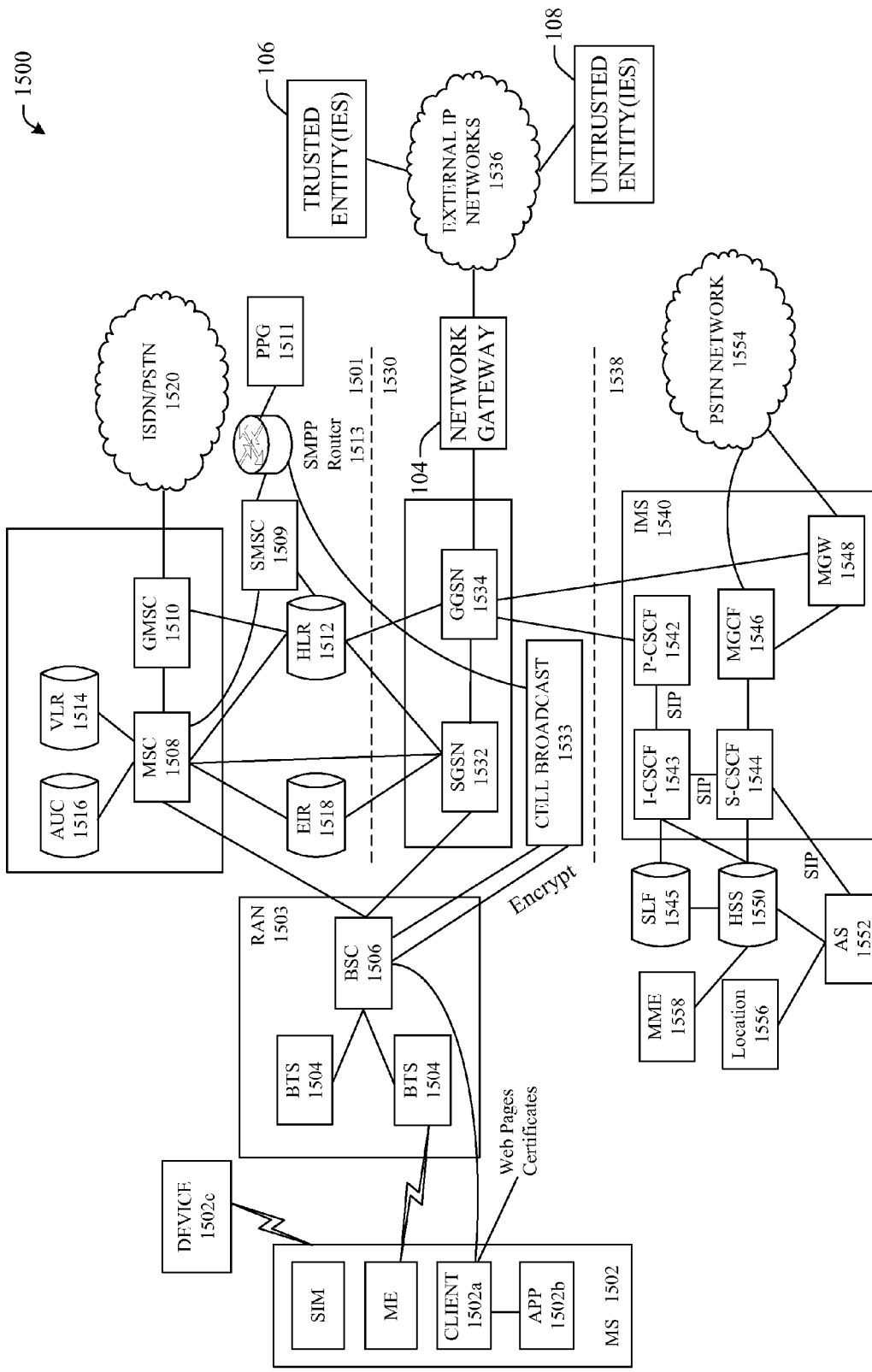
FIG. 15 illustrates a Global System for Mobile Communications (GSM)/General Packet Radio Service (GPRS)/Internet protocol (IP) multimedia network architecture that can employ the disclosed architecture.

Now turning to FIG. 15, there is depicted an example GSM/GPRS/IP multimedia network architecture 1500 that can employ the disclosed communication architecture. In particular, the GSM/GPRS/IP multimedia network architecture 1500 includes a GSM core network 1501, a GPRS network 1530 and an IP multimedia network 1538. The GSM core network 1501 includes a Mobile Station (MS) 1502, at least one Base Transceiver Station (BTS) 1504 and a Base Station Controller (BSC) 1506. The MS 1502 is physical equipment or Mobile Equipment (ME), such as a mobile phone or a laptop computer that is used by mobile subscribers, with a Subscriber identity Module (SIM). The SIM includes an International Mobile Subscriber Identity (IMSI) and/or MSISDN, which is a unique identifier of a subscriber. The MS 1502 includes an embedded client 1502a that receives and processes messages received by the MS 1502. The embedded client 1502a can be implemented in JAVA and is discussed more fully below. It is noted that MS 1502 can be substantially similar to UE 102 and UE 1402, and can include functionality described with respect to UEs 102, 1402 in systems 100-900 and 1400.

The embedded client 1502a communicates with an application 1502b that provides services and/or information to an end user. In one aspect, embedded client 1502a includes the ACR client component 602 described in detail with respect to systems 600-900 and 1400. Further, the application 1502b can include application(s) 604 described in detail with respect to systems 600 and 700. Additionally or alternately, the MS 1502 and a device 1502c can be enabled to communicate via a short-range wireless communication link, such as BLUETOOTH®. Further, MS 1502 can also communicate with communication network 2 (504) (e.g., a WiFi network). As one of ordinary skill in the art would recognize, there can be an unlimited number of devices 1502c that use the SIM within the MS 1502 to provide services, information, data, audio, video, etc. to end users.

The BTS 1504 is physical equipment, such as a radio tower, that enables a radio interface to communicate with the MS 1502. Each BTS can serve more than one MS. The BSC 1506 manages radio resources, including the BTS. The BSC 1506 can be connected to several BTSs. The BSC and BTS components, in combination, are generally referred to as a base station (BSS) or radio access network (RAN) 1503.

The GSM core network 1501 also includes a Mobile Switching Center (MSC) 1508, a Gateway Mobile Switching Center (GMSC) 1510, a Home Location Register (HLR) 1512, Visitor Location Register (VLR) 1514, an Authentication Center (AuC) 1518, and an Equipment Identity Register (EIR) 1518. The MSC 1508 performs a switching function for the network. The MSC also performs other functions, such as registration, authentication, location updating, handovers, and call routing. The GMSC 1510 provides a gateway between the GSM network and other networks, such as an Integrated Services Digital Network (ISDN) or Public Switched Telephone Networks (PSTNs) 1520. In other words, the GMSC 1510 provides interworking functionality with external networks.

The HLR 1512 is a database or component(s) that comprises administrative information regarding each subscriber registered in a corresponding GSM network. The HLR 1512 also includes the current location of each MS. The VLR 1514 is a database or component(s) that contains selected administrative information from the HLR 1512. The VLR contains information necessary for call control and provision of subscribed services for each MS currently located in a geographical area controlled by the VLR. The HLR 1512 and the VLR 1514, together with the MSC 1508, provide the call routing and roaming capabilities of GSM. The AuC 1516 provides the parameters needed for authentication and encryption functions. Such parameters allow verification of a subscriber's identity. The EIR 1518 stores security-sensitive information about the mobile equipment. In one aspect, the AuC 1516 performs a SIM authentication, in response to MS 1502, for example, powering-on and/or entering a coverage area of the BTS 1504. The SIM authentication allows the MS 1502 to communicate via the GSM/GPRS/IP multimedia network. By way of example, on authentication, a Gateway GPRS Support Node (GGSN) 1534, can assign an Internet protocol (IP) address to the MS 1502, receive a device number, such as, but not limited to, a MSISDN associated with the MS 1502 from the HLR 1512, and propagate the IP address and corresponding MSISDN to downstream network elements such as the network gateway 104. The network gateway 104 can include functionality as more fully described herein, for example, as described above with regard to systems 100 and 200.

A Short Message Service Center (SMSC) 1509 allows one-to-one Short Message Service (SMS) messages to be sent to/from the MS 1502. A Push Proxy Gateway (PPG) 1511 is used to "push" (e.g., send without a synchronous request) content to the MS 1502. The PPG 1511 acts as a proxy between wired and wireless networks to facilitate pushing of data to the MS 1502. A Short Message Peer to Peer (SMPP) protocol router 1513 is provided to convert SMS-based SMPP messages to cell broadcast messages. SMPP is a protocol for exchanging SMS messages between SMS peer entities such as short message service centers. It is often used to allow third parties, e.g., content suppliers such as news organizations, to submit bulk messages.

To gain access to GSM services, such as speech, data, and short message service (SMS), the MS 1502 first registers with the network to indicate its current location by performing a location update and IMSI attach procedure. The MS 1502 sends a location update including its current location information to the MSC/VLR, via the BTS 1504 and the BSC 1506. The location information is then sent to the MS's HLR. The HLR is updated with the location information received from the MSC/VLR. The location update also is performed when the MS moves to a new location area. Typically, the location update is periodically performed to update the database as location-updating events occur.

The GPRS network 1530 is logically implemented on the GSM core network architecture by introducing two packet-switching network nodes, a serving GPRS support node (SGSN) 1532, a cell broadcast and a Gateway GPRS support node (GGSN) 1534. The SGSN 1532 is at the same hierarchical level as the MSC 1508 in the GSM network. The SGSN controls the connection between the GPRS network and the MS 1502. The SGSN also keeps track of individual MS's locations, security functions, and access controls.

A Cell Broadcast Center (CBC) 1533 communicates cell broadcast messages that are typically delivered to multiple users in a specified area. Cell Broadcast is one-to-many geographically focused service. It enables messages to be communicated to multiple mobile phone customers who are located within a given part of its network coverage area at the time the message is broadcast.

The GGSN 1534 provides a gateway between the GPRS network and a public packet network (PDN) or other IP networks 1536. That is, the GGSN provides interworking functionality with external networks, and sets up a logical link to the MS 1502 through the SGSN 1532. In one aspect, the GGSN 1534 is coupled to the other IP networks 1536 via the network gateway 104. Moreover, network gateway 104 can be coupled to the ACRS component 210, which can include functionality as more fully described herein, for example, as described above with regard to systems 200-400 and 600-900. Although it is depicted in FIG. 15 as residing outside the GGSN 1534, the network gateway 104 and/or ACRS component 210 can reside within (e.g., completely or partially) the GGSN 1534. When packet-switched data leaves the GPRS network, it is transferred to an external TCP-IP network 1536, such as an X.25 network or the Internet. In order to access GPRS services, the MS 1502 first attaches itself to the GPRS network by performing an attach procedure. The MS 1502 then activates a packet data protocol (PDP) context, thus activating a packet communication session between the MS 1502, the SGSN 1532, and the GGSN 1534. In a GSM/GPRS network, GPRS services and GSM services can be used in parallel. A GPRS network 1530 can be designed to operate in three network operation modes (NOM1, NOM2 and NOM3). A network operation mode of a GPRS network is indicated by a parameter in system information messages transmitted within a cell. The system information messages dictates a MS where to listen for paging messages and how signal towards the network. The network operation mode represents the capabilities of the GPRS network.

The IP multimedia network 1538 was introduced with 3GPP Release 5, and includes an IP multimedia subsystem (IMS) 1540 to provide rich multimedia services to end users. A representative set of the network entities within the IMS 1540 are a call/session control function (CSCF), a media gateway control function (MGCF) 1546, a media gateway (MGW) 1548, and a master subscriber database, called a home subscriber server (HSS) 1550. The HSS 1550 can be common to the GSM network 1501, the GPRS network 1530 as well as the IP multimedia network 1538.

The IP multimedia system 1540 is built around the call/session control function, of which there are three types: an interrogating CSCF (I-CSCF) 1543, a proxy CSCF (P-CSCF) 1542, and a serving CSCF (S-CSCF) 1544. The P-CSCF 1542 is the MS's first point of contact with the IMS 1540. The P-CSCF 1542 forwards session initiation protocol (SIP) messages received from the MS to an SIP server in a home network (and vice versa) of the MS. The P-CSCF 1542 can also modify an outgoing request according to a set of rules defined by the network operator (for example, address analysis and potential modification).

The I-CSCF 1543 forms an entrance to a home network and hides the inner topology of the home network from other networks and provides flexibility for selecting an S-CSCF. The I-CSCF 1543 can contact a subscriber location function (SLF) 1545 to determine which HSS 1550 to use for the particular subscriber, if multiple HSSs 1550 are present. The S-CSCF 1544 performs the session control services for the MS 1502. This includes routing originating sessions to external networks and routing terminating sessions to visited networks. The S-CSCF 1544 also decides whether an application server (AS) 1552 is required to receive information on an incoming SIP session request to ensure appropriate service handling. This decision is based on information received from the HSS 1550 (or other sources, such as an application server 1552). The AS 1552 also communicates to a location server 1556 (e.g., a Gateway Mobile Location Center (GMLC)) that provides a position (e.g., latitude/longitude coordinates) of the MS 1502. The MME 1558 provides authentication of a user by interacting with the HSS 1550 in LTE networks.

The HSS 1550 contains a subscriber profile and keeps track of which core network node is currently handling the subscriber. It also supports subscriber authentication and authorization functions (AAA). In networks with more than one HSS 1550, a subscriber location function provides information on the HSS 1550 that contains the profile of a given subscriber.

The MGCF 1546 provides interworking functionality between SIP session control signaling from the IMS 1540 and ISUP/BICC call control signaling from the external GSTN networks (not shown). It also controls the media gateway (MGW) 1548 that provides user-plane interworking functionality (e.g., converting between AMR- and PCM-coded voice). The MGW 1548 also communicates with a PSTN network 1554 for TDM trunks. In addition, the MGCF 1546 communicates with the PSTN network 1554 for SS7 links. According to an embodiment, systems 100-900 disclosed herein can be implemented at least in part within and/or communicatively coupled to the GSM network 1501, the GPRS network 1530, the IP multimedia network 1538, and/or the IP networks 1536.

Figure 16:
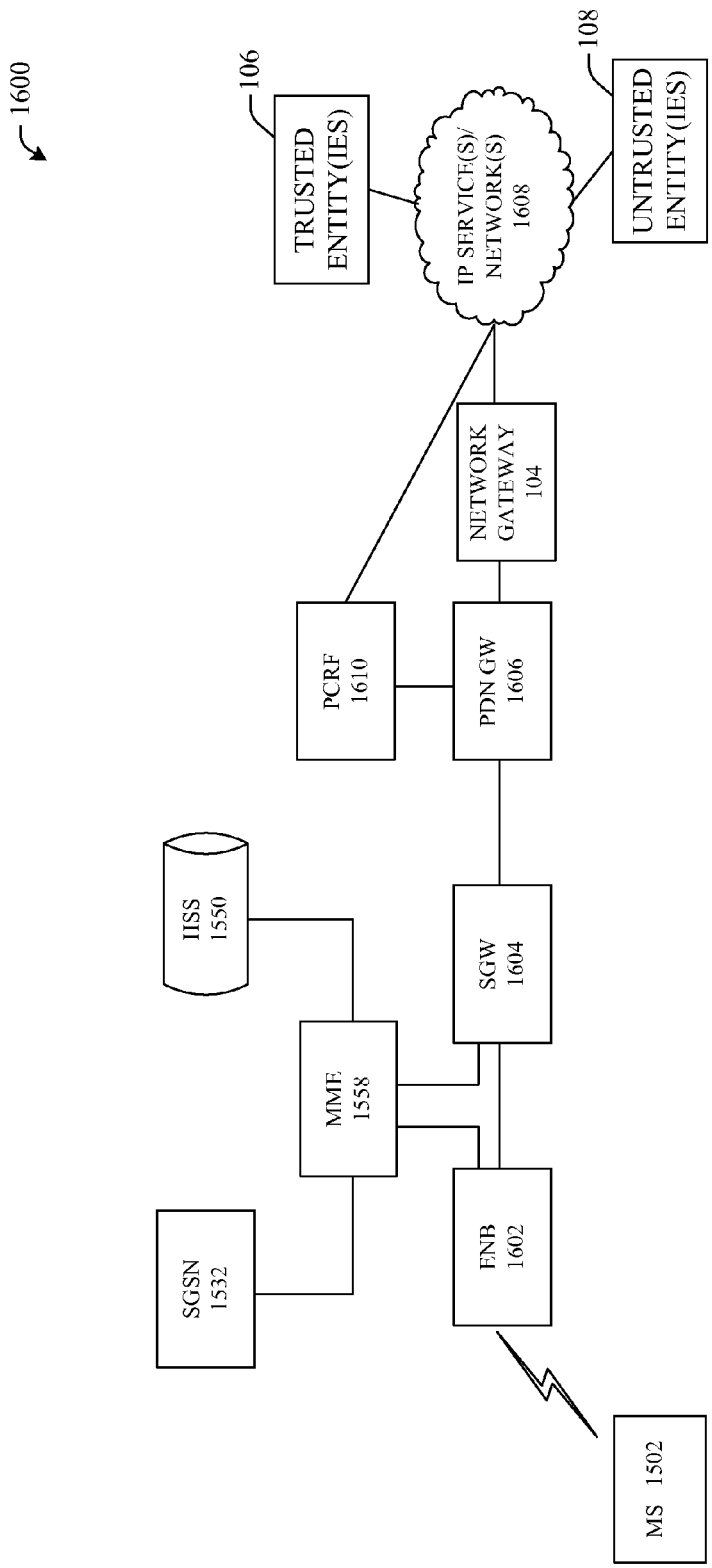
FIG. 16 illustrates a Long Term Evolution (LTE) network architecture that can employ the disclosed architecture.

FIG. 16 illustrates a high-level block diagram that depicts an example LTE network architecture 1600 that can employ the disclosed communication architecture. MS 1502, SGSN 1532, HSS 1550, MME 1558, network gateway 104, trusted entity(ies) 106, and untrusted entity(ies) 108 can include functionality as more fully described herein, for example, as described above with regard to systems 100-900 and 1500.

The evolved RAN for LTE consists of an eNodeB (eNB) 1602 that can facilitate connection of MS 1502 to an evolved packet core (EPC) network. The connection of the MS 1502 to the evolved packet core (EPC) network is subsequent to an authentication, for example, a SIM-based authentication between the MS 1502 and the evolved packet core (EPC) network. As an example, the eNB 1602 can host a PHYsical (PHY), Medium Access Control (MAC), Radio Link Control (RLC), and Packet Data Control Protocol (PDCP) layers that include the functionality of user-plane header-compression and encryption. In addition, the eNB 1602 can implement at least in part Radio Resource Control (RRC) functionality (e.g., radio resource management, admission control, scheduling, cell information broadcast, etc.). The eNB 1602 can be coupled to a serving gateway (SGW) 1604 that facilitates routing of user data packets and serves as a local mobility anchor for data bearers when the MS 1502 moves between eNBs. In addition, the SGW 1604 can act as an anchor for mobility between LTE and other 3GPP technologies (GPRS, UMTS, etc.). When MS 1502 is in an idle state, the SGW 1604 terminates a downlink (DL) data path and triggers paging when DL data arrives for the MS 1502. Further, the SGW 1604 can perform various administrative functions in the visited network such as collecting information for charging and lawful interception.

In one aspect, the SGW 1604 can be coupled to a Packet Data Network Gateway (PDN GW) 1606 that provides connectivity between the MS 1502 and external packet data networks such as IP service(s)/network(s) 1608. Moreover, the PDN GW 1606 is a point of exit and entry of traffic for the MS 1502. It is noted that the MS 1502 can have simultaneous connectivity with more than one PDN GW (not shown) for accessing multiple PDNs.

The PDN GW 1606 performs IP address allocation for the MS 1502, as well as QoS enforcement and implements flow-based charging according to rules from a Policy Control and Charging Rules Function (PCRF) 1610. The PCRF 1610 can facilitate policy control decision-making and control flow-based charging functionalities in a Policy Control Enforcement Function (PCEF), which resides in the PDN GW 1606. The PCRF 1610 can store data (e.g., QoS class identifier and/or bit rates) that facilitates QoS authorization of data flows within the PCEF.

In one aspect, the PDN GW 1606 can facilitate filtering of downlink user IP packets into the different QoS-based bearers and perform policy enforcement, packet filtering for each user, charging support, lawful interception and packet screening. Further, the PDN GW acts as the anchor for mobility between 3GPP and non-3GPP technologies such as WiMAX and 3GPP2 (CDMA 1× and EvDO).

In one aspect, the PDN GW 1606 is coupled to the IP service(s)/network(s) 1608 via the network gateway 104. The network gateway 104 can be coupled to the ACRS component 210, which can include functionality as more fully described herein, for example, as described above with regard to systems 200-400 and 600-900. Although it is depicted in FIG. 16 as residing outside the PDN GW 1606, the network gateway 104 and/or ACRS component 210 can reside within (e.g., completely or partially) the PDN GW 1606. Although the GSM/GPRS/IP multimedia network architecture 1500 and LTE network architecture 1600 is described and illustrated herein, it is noted that most any communication network architecture can be utilized to implement the disclosed embodiments.

Figure 17:
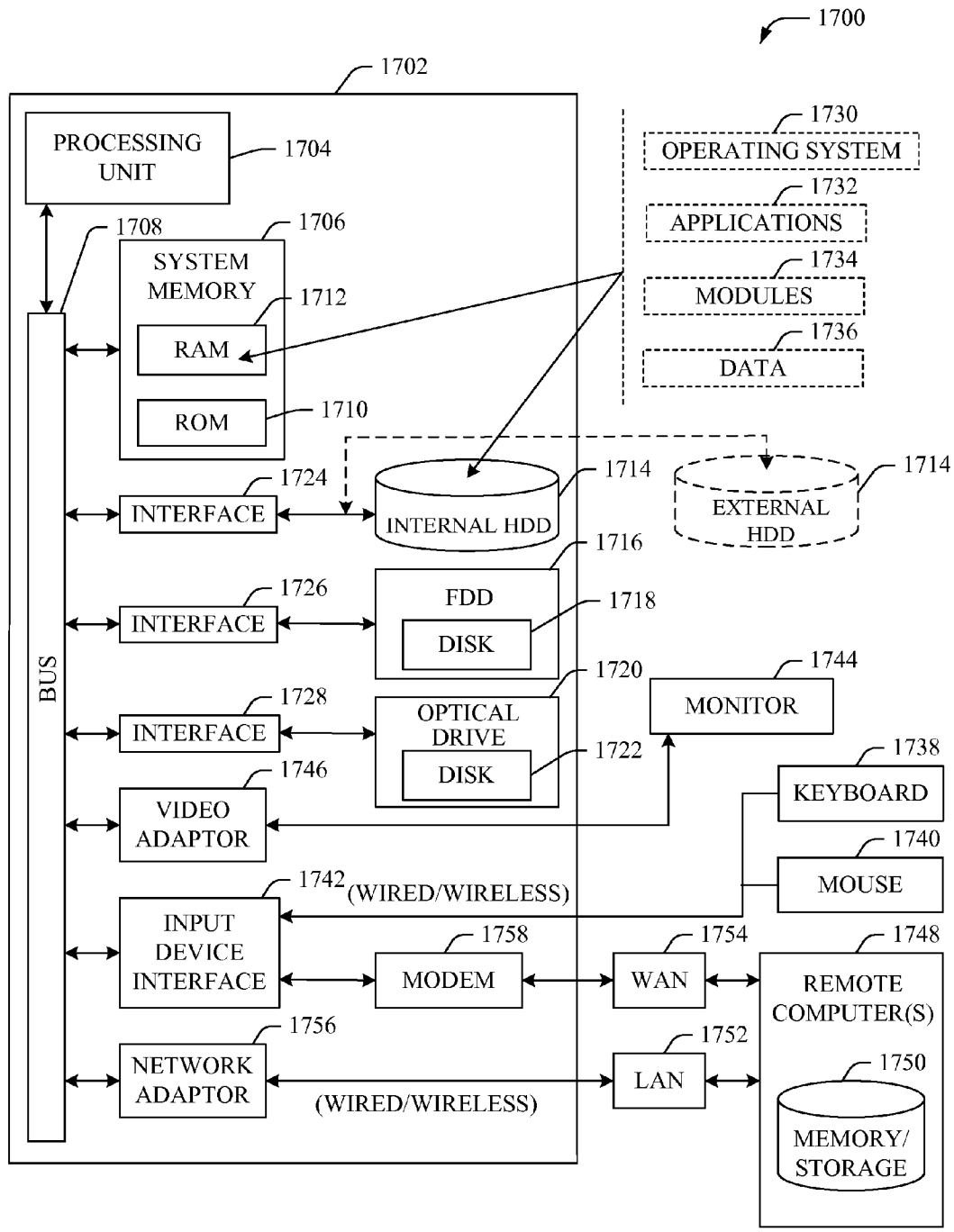
FIG. 17 illustrates a block diagram of a computer operable to execute the disclosed communication architecture.

Referring now to FIG. 17, there is illustrated a block diagram of a computer 1702 operable to execute the disclosed communication architecture. In order to provide additional context for various aspects of the disclosed subject matter, FIG. 17 and the following discussion are intended to provide a brief, general description of a suitable computing environment 1700 in which the various aspects of the specification can be implemented. While the specification has been described above in the general context of computer-executable instructions that can run on one or more computers, those skilled in the art will recognize that the specification also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the specification can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 17, the example environment 1700 for implementing various aspects of the specification includes a computer 1702, the computer 1702 including a processing unit 1704, a system memory 1706 and a system bus 1708. As an example, the gateway(s), entity(ies), component(s), server(s), and platform(s) (e.g., network gateway 104, trusted entity(ies) 106, untrusted entity(ies) 108, ACRS component 210, ACR client component 602, API platform 306, UE 102, authorization server 806, etc.) disclosed herein with respect to system 100-900 can each include at least a portion of the computer 1702. In another example, a combination of the gateway(s), entity(ies), component(s), server(s), and/or platform(s) can each include one or more computers such as, or substantially similar to, computer 1702. Further, each of the network element(s) (stand alone and/or in combination with one or more other network elements) disclosed herein with respect to systems 1500 and 1600 can include at least a portion of computer 1702, or can include one or more computers such as, or substantially similar to, computer 1702. The system bus 1708 couples system components including, but not limited to, the system memory 1706 to the processing unit 1704. The processing unit 1704 can be any of various commercially available processors. Dual microprocessors and other multi-processor architectures can also be employed as the processing unit 1704.

The system bus 1708 can be any of several types of bus structure that can further interconnect to a memory bus (with or without a memory controller), a peripheral bus, and a local bus using any of a variety of commercially available bus architectures. The system memory 1706 includes read-only memory (ROM) 1710 and random access memory (RAM) 1712. A basic input/output system (BIOS) is stored in a non-volatile memory 1710 such as ROM, EPROM, EEPROM, which BIOS contains the basic routines that help to transfer information between elements within the computer 1702, such as during startup. The RAM 1712 can also include a high-speed RAM such as static RAM for caching data.

The computer 1702 further includes an internal hard disk drive (HDD) 1714, which internal hard disk drive 1714 can also be configured for external use in a suitable chassis (not shown), a magnetic floppy disk drive (FDD) 1716, (e.g., to read from or write to a removable diskette 1718) and an optical disk drive 1720, (e.g., reading a CD-ROM disk 1722 or, to read from or write to other high capacity optical media such as the DVD). The hard disk drive 1714, magnetic disk drive 1716 and optical disk drive 1720 can be connected to the system bus 1708 by a hard disk drive interface 1724, a magnetic disk drive interface 1726 and an optical drive interface 1728, respectively. The interface 1724 for external drive implementations includes at least one or both of Universal Serial Bus (USB) and IEEE 1394 interface technologies. Other external drive connection technologies are within contemplation of the subject disclosure.

The drives and their associated computer-readable storage media provide nonvolatile storage of data, data structures, computer-executable instructions, and so forth. For the computer 1702, the drives and storage media accommodate the storage of any data in a suitable digital format. Although the description of computer-readable storage media above refers to a HDD, a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods of the specification.

A number of program modules can be stored in the drives and RAM 1712, including an operating system 1730, one or more application programs 1732, other program modules 1734 and program data 1736. All or portions of the operating system, applications, modules, and/or data can also be cached in the RAM 1712. It is appreciated that the specification can be implemented with various commercially available operating systems or combinations of operating systems.

A user can enter commands and information into the computer 1702 through one or more wired/wireless input devices, e.g., a keyboard 1738 and/or a pointing device, such as a mouse 1740 or a touchscreen or touchpad (not illustrated, but which may be integrated into UE 102 in some embodiments). These and other input devices are often connected to the processing unit 1704 through an input device interface 1742 that is coupled to the system bus 1708, but can be connected by other interfaces, such as a parallel port, an IEEE 1394 serial port, a game port, a USB port, an IR interface, etc. A monitor 1744 or other type of display device is also connected to the system bus 1708 via an interface, such as a video adapter 1746.

The computer 1702 can operate in a networked environment using logical connections via wired and/or wireless communications to one or more remote computers, such as a remote computer(s) 1748. The remote computer(s) 1748 can be a workstation, a server computer, a router, a personal computer, portable computer, microprocessor-based entertainment appliance, a peer device or other common network node, and typically includes many or all of the elements described relative to the computer 1702, although, for purposes of brevity, only a memory/storage device 1750 is illustrated. The logical connections depicted include wired/ wireless connectivity to a local area network (LAN) 1752 and/or larger networks, e.g., a wide area network (WAN) 1754. Such LAN and WAN networking environments are commonplace in offices and companies, and facilitate enterprise-wide computer networks, such as intranets, all of which can connect to a global communications network, e.g., the Internet.

When used in a LAN networking environment, the computer 1702 is connected to the local network 1752 through a wired and/or wireless communication network interface or adapter 1756. The adapter 1756 can facilitate wired or wireless communication to the LAN 1752, which can also include a wireless access point disposed thereon for communicating with the wireless adapter 1756.

When used in a WAN networking environment, the computer 1702 can include a modem 1758, or is connected to a communications server on the WAN 1754, or has other means for establishing communications over the WAN 1754, such as by way of the Internet. The modem 1758, which can be internal or external and a wired or wireless device, is connected to the system bus 1708 via the serial port interface 1742. In a networked environment, program modules depicted relative to the computer 1702, or portions thereof, can be stored in the remote memory/storage device 1750. It will be appreciated that the network connections shown are example and other means of establishing a communications link between the computers can be used.

The computer 1702 is operable to communicate with any wireless devices or entities operatively disposed in wireless communication, e.g., desktop and/or portable computer, server, communications satellite, etc. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10 BaseT wired Ethernet networks used in many offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "data store," data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
    a processor; and
    a memory that stores executable instructions that, when executed by the processor, facilitate performance of operations, comprising:
        receiving, via a network device of a telecommunication network, a message sent from a user equipment and directed to a device of an untrusted entity, the user equipment being authenticated to the network device of the telecommunication network using a static identifier associated with the user equipment;
        assigning a domain-specific first anonymous customer reference to the static identifier;
        inserting the domain-specific first anonymous customer reference into the message resulting in an updated message;
        facilitating a transmission of the updated message to the device of the untrusted entity;
        receiving a request for a second anonymous customer reference; and based on determining that the second anonymous customer reference is a valid anonymous customer reference, transmitting the second anonymous customer reference to a network gateway device of the telecommunication network.

2. The system of claim 1, wherein the operations further comprise:
inserting the domain-specific first anonymous customer reference into a subsequent message transmitted from the user equipment to the device of the untrusted entity resulting in an updated subsequent message; and
facilitating a second transmission of the updated subsequent message to the device of the untrusted entity.

3. The system of claim 1, wherein the operations further comprise:
generating the domain-specific first anonymous customer reference based at least in part on address data associated with the device of the untrusted entity.

4. The system of claim 3, wherein the address data comprises at least one of a uniform resource locator, a fully qualified domain name, an internet protocol address, or a uniform resource identifier.

5. The system of claim 3, wherein the operations further comprise:
generating the domain-specific first anonymous customer reference based at least in part on a cryptographic hash of the address data.

6. The system of claim 3, wherein the operations further comprise:
generating the domain-specific first anonymous customer reference based at least in part on a static encryption key that is determined based on the address data.

7. The system of claim 6, wherein the operations further comprise:
directing, to another device of a trusted entity, a decryption key corresponding to the static encryption key, wherein the other device of the trusted entity utilizes the decryption key to calculate the static identifier based on the domain-specific first anonymous customer reference in response to receipt of the domain-specific first anonymous customer reference from the device of the untrusted entity.

8. The system of claim 3, wherein the operations further comprise:
generating the domain-specific first anonymous customer reference based at least in part on a dynamic encryption key.

9. The system of claim 8, wherein the operations further comprise:
directing data associated with the dynamic encryption key to another device of a trusted entity, wherein the other device of the trusted entity utilizes the data to determine a current value of the dynamic encryption key and employs the current value of the dynamic encryption key to determine the static identifier based on the domain-specific first anonymous customer reference in response to receipt of the domain-specific first anonymous customer reference from the device of the untrusted entity.

10. The system of claim 1, wherein the static identifier is associated with a subscriber identity module of the user equipment.

11. The system of claim 1, wherein the operations further comprise:
deleting the domain-specific first anonymous customer reference based on a condition associated with an authorization of the user equipment being determined to have been satisfied, wherein the condition is a verification of the authorization of the user equipment.

12. A method, comprising:
receiving, by a system comprising at least one processor within a wireless communication network, a communication transmitted by a user equipment and directed to a device of an untrusted entity;
determining, by the system, a static identifier associated with the user equipment based at least in part on an authorization of the user equipment with the wireless communication network;
determining, by the system, a static encryption key based on address data associated with the device of the untrusted entity;
receiving, by the system, a request for an anonymous customer reference;
determining, by the system, that a previous anonymous customer reference associated with the untrusted entity is unavailable;
based at least in part on the static identifier, the static encryption key, and the previous anonymous customer reference being determined to be unavailable, generating, by the system, the anonymous customer reference specific to the untrusted entity;
inserting, by the system, the anonymous customer reference into the communication; and
facilitating, by the system, a transmission of the communication comprising the anonymous customer reference to the device of the untrusted entity.

13. The method of claim 12, wherein the transmission is a first transmission and the method further comprises:
receiving, by the system, a subsequent communication transmitted by the user equipment and directed to the device of the untrusted entity;
inserting, by the system, the anonymous customer reference into the subsequent communication; and
facilitating, by the system, a second transmission of the subsequent communication including the inserted anonymous customer reference to the device of the untrusted entity.

14. The method of claim 12, wherein the generating comprises applying a cryptographic hash to address data associated with the device of the untrusted entity.

15. The method of claim 12, wherein the generating comprises encrypting address data associated with the device of the untrusted entity based on the static encryption key.

16. The method of claim 12, wherein the generating comprises encrypting address data associated with the device of the untrusted entity based on a dynamic encryption key.

17. The method of claim 12, wherein the anonymous customer reference is generated in response to receiving a user authorization.

18. A non-transitory machine-readable storage medium, comprising executable instructions that, when executed by a processor, facilitate performance of operations, comprising:
receiving a message transmitted from a user equipment and directed to a device of an untrusted entity;
identifying a static identifier associated with the user equipment based at least in part on an authorization of the user equipment with a telecommunication network;
determining a static encryption key based on address data associated with the device of the untrusted entity;
receiving an anonymous customer reference request, wherein the anonymous customer reference request comprises an anonymous customer reference;

modifying the message resulting in a modified message, the modifying comprising inserting the anonymous customer reference into the message;

transmitting a decryption key to another device of a trusted entity in response to a condition related to the trusted entity being determined to have been satisfied; and directing the modified message to the device of the untrusted entity.

19. The non-transitory machine readable storage medium of claim 18, wherein the anonymous customer reference is a first anonymous customer reference, and wherein the operations further comprise:

generating a second anonymous customer reference based on encrypting address data associated with the device of the untrusted entity.

20. The non-transitory machine readable storage medium of claim 19, wherein the operations further comprise:

verifying user authorization prior to the generating the second anonymous customer reference.

* * * * *